United States Patent
Fukuzawa et al.

(10) Patent No.: US 8,738,057 B2
(45) Date of Patent: May 27, 2014

(54) WIRELESS TERMINAL DEVICE, WIRELESS COMMUNICATION METHOD, AND WIRELESS COMMUNICATION SYSTEM AND PROGRAM

(75) Inventors: Shoji Fukuzawa, Osaka (JP); Yoshiyuki Tanaka, Osaka (JP)

(73) Assignee: Icom Incorporated (JP)

( * ) Notice: Subject to any disclaimer, the term of this patent is extended or adjusted under 35 U.S.C. 154(b) by 582 days.

(21) Appl. No.: 13/121,941

(22) PCT Filed: Oct. 28, 2009

(86) PCT No.: PCT/JP2009/068534
§ 371 (c)(1),
(2), (4) Date: Mar. 30, 2011

(87) PCT Pub. No.: WO2010/050531
PCT Pub. Date: May 6, 2010

(65) Prior Publication Data
US 2011/0306290 A1    Dec. 15, 2011

(30) Foreign Application Priority Data
Oct. 28, 2008    (JP) .................................. 2008-277520

(51) Int. Cl.
*H04B 7/00*    (2006.01)
*H04W 76/02*    (2009.01)

(52) U.S. Cl.
CPC .................................. *H04W 76/023* (2013.01)
USPC ........... 455/517; 455/518; 455/519; 455/520; 455/41.1; 455/41.2

(58) Field of Classification Search
USPC ................. 455/517–520, 41.1–41.3
See application file for complete search history.

(56) References Cited

U.S. PATENT DOCUMENTS

2005/0036469 A1*    2/2005    Wentink ........................ 370/338
2009/0029710 A1*    1/2009    Ochiai et al. .................. 455/450
2012/0046062 A1*    2/2012    Namm et al. .................. 455/520

FOREIGN PATENT DOCUMENTS

| CN | 1949899 | 4/2007 |
|---|---|---|
| JP | 2002-281557 | 9/2002 |
| JP | 2006-086923 | 3/2006 |
| JP | 2007-060071 | 3/2007 |
| JP | 2007-295541 | 11/2007 |
| JP | 2007-300286 | 11/2007 |
| JP | 2007295134 | 11/2007 |

OTHER PUBLICATIONS

Notification of First Office Action, issued on May 27, 2013, in corresponding Chinese Application No. 200980141240.0.
Extended European Search Report, issued May 23, 2013, in corresponding European Application No. 09823641.7.
Notification of Reasons for Rejection issued in Japanese Patent Application No. 2009-248330 on May 14, 2013.

* cited by examiner

*Primary Examiner* — Fayyaz Alam
(74) *Attorney, Agent, or Firm* — Baker & McKenzie LLP

(57) ABSTRACT

A wireless terminal device (TA) receives a downlink signal that is repeatedly transmitted from a pre registered home repeater when requesting communication, specifies an idle channel based on idle channel information that is included in the downlink signal, and using the frequency of the uplink signal of the idle channel requests communication permission from the relay device that provides the idle channel. When communication permission cannot be received from the relay device from which communication permission was previously requested, the wireless terminal device (TA) uses the same frequency as the frequency of the downlink signal from the home repeater to transmit a signal to the wireless terminal device (TB) of an intended other party requesting communication.

9 Claims, 13 Drawing Sheets

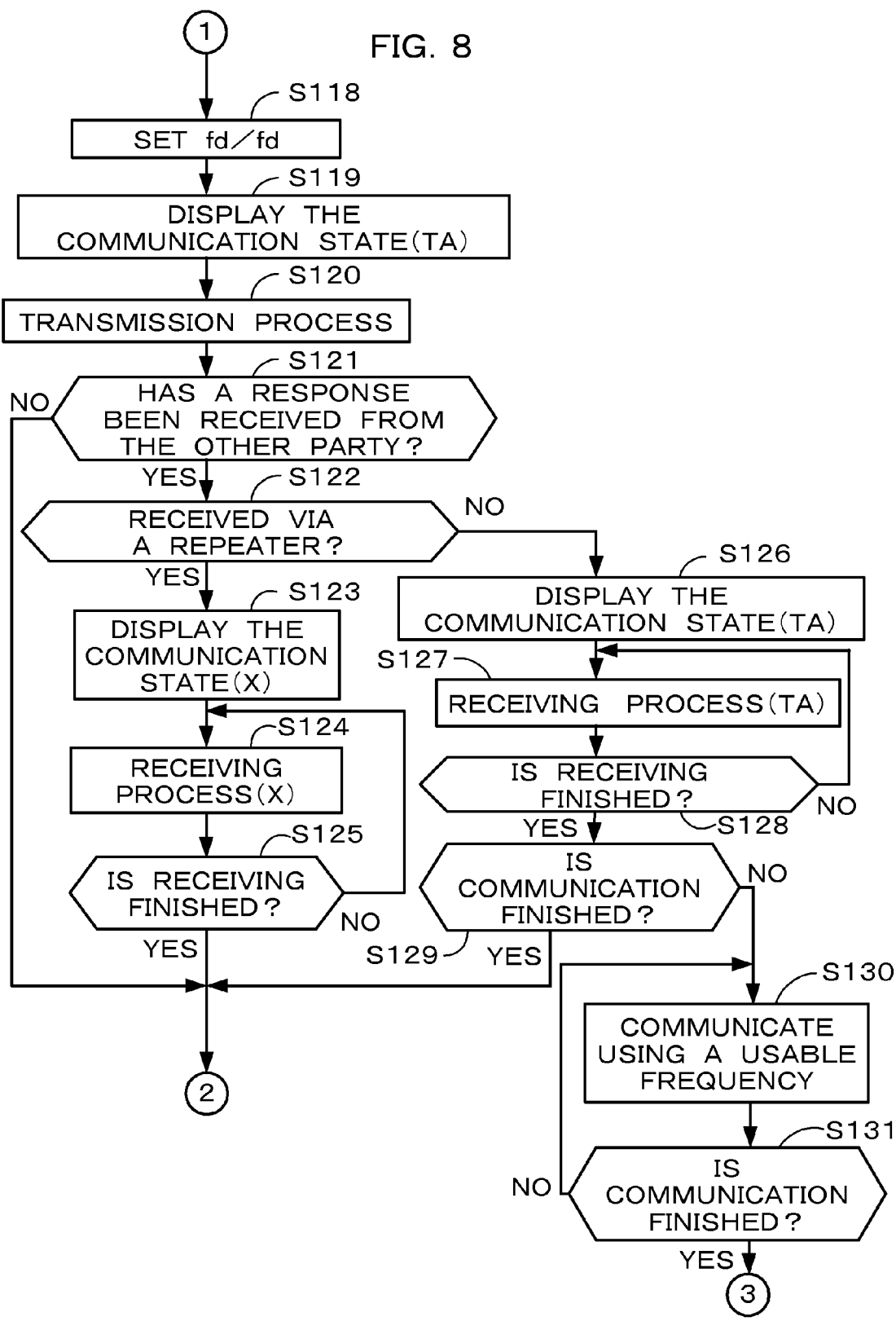

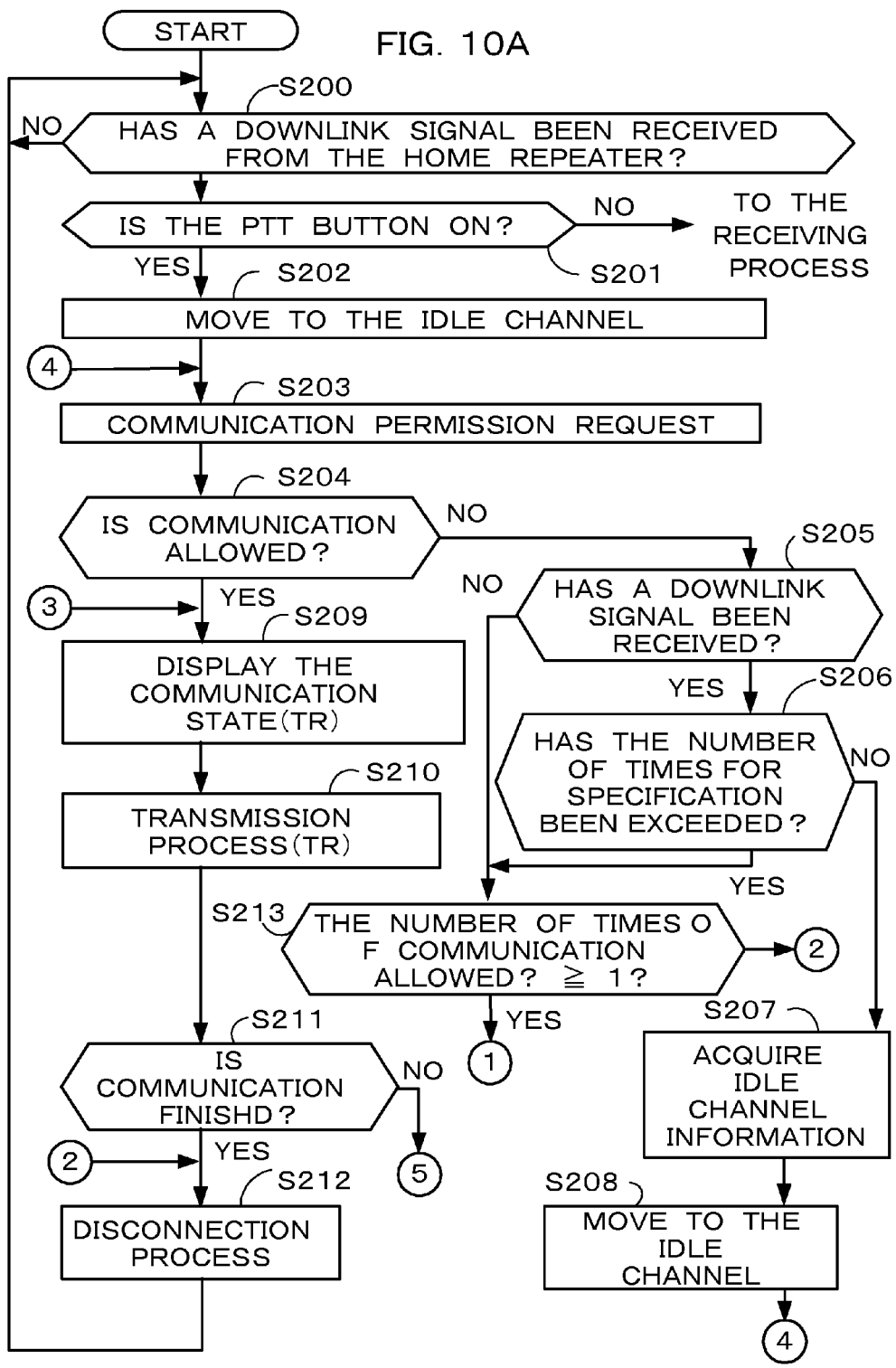

WIRELESS TERMINAL DEVICE, WIRELESS COMMUNICATION METHOD, AND WIRELESS COMMUNICATION SYSTEM AND PROGRAM

RELATED APPLICATION

This application is based on Japanese Patent Application No. 2008-277520 filed on Oct. 28, 2008. The entire specification, claims and drawings of that application are incorporated in this specification by reference.

TECHNICAL FIELD

The present invention relates to a wireless terminal device, a wireless communication method, and a wireless communication system and program, and more particularly to a procedure for setting a method for communicating between a wireless terminal device and another wireless terminal device.

BACKGROUND ART

In recent years, as the use of wireless terminal devices has dramatically increased, the amount of communication that is relayed by relay devices such as repeaters is also steadily increasing. Consequently, when a wireless terminal device performs communication with another wireless terminal device, a distributed trunking method wireless communication system that selects at least one of a plurality of relay devices that are connected together via specified communication lines has become widely used. Furthermore, wireless terminal devices are also known that have both a talk-around function for direct communication between wireless terminal devices without via a repeater, and a trunking function.

A wireless terminal device that has a trunking function and talk-around function can be switched by user control from the trunking method, in which a repeater relays communication, to the talk-around method, in which direct communication is performed between wireless terminal devices, when leaving the coverage area of a repeater, or in other words, when out of range. In order to omit this kind of user operation, a function is proposed in which when transmission to a repeater by a wireless communication device using the trunking method fails, the communication method is automatically switched to the talk-around function. For example, in Patent Literature 1, the wireless communication device comprises an external connector and microcomputer, and inputs and stores a trunk system communication instruction signal that gives an instruction to perform communication using the trunked system (trunking method) that is provided via the external connector, a TA communication instruction signal that gives an instruction to perform communication using the TA (talk-around) function, and a frequency instruction signal that gives an instruction for the transmitting frequency. The wireless communication device is constructed such that when an instruction is given to perform trunked system communication, the wireless communication device performs transmission processing via a repeater at a transmitting frequency based on the frequency instruction signal, and when a state in which there is no signal from the repeater within a predetermined period continues several times, the wireless communication device sets the receiving frequency to the transmitting frequency of the intended communicating party, sets the transmitting frequency to the receiving frequency of the intended communicating party and performs communication using the talk-around function.

Patent Literature 1: Unexamined Japanese Patent Application KOKAI publication No. 2007-60071.

In the technology disclosed in Patent Literature 1, after transmission to a repeater, when a state in which there is no signal back from the repeater within a specified period of time continues several times, communication is performed using the talk-around method, and when a signal is received back from the repeater, communication is performed using the trunking method. However, when communication is performed between a wireless terminal device having a relatively high level of transmission power (for example a mobile type of device) and a wireless terminal device having low transmission power (for example, a battery-operated portable type of device), as both terminals separate from the repeater and are located in the vicinity of the boundary between being in the coverage area and being out of range, deterioration of the communication quality may occur. In the vicinity of the boundary, the wireless terminal device having large transmission power is able to transmit an uplink signal to the repeater as well as receive a downlink signal from the repeater; however, even though the wireless terminal device having low transmission power may be able to receive a downlink signal from the repeater, an uplink signal may not reach the repeater. Particularly, in the so-called fringe area, which is the vicinity of the boundary between being in the service area and being out of range where the radio wave environment is unstable, deterioration of the communication quality remarkably occurs. Therefore, by switching between the trunking method and the talk-around method by just whether or not a downlink signal is detected from the repeater as in the technology of Patent Literature 1, this problem cannot be solved. Furthermore, when switching between the trunking method and talk-around method in the technology of Patent Literature 1, both the receiving frequency and the transmitting frequency must be changed, so that the time required for switching becomes long, and when communication becomes disrupted, deterioration of communication quality occurs.

The object of the present invention is to solve the aforementioned problems by providing a wireless terminal device, a wireless communication method, and a wireless communication system and program that maintain good communication quality even in communication by a pair of wireless terminal devices having a difference in level of transmission power or in areas where the radio signal environment is unstable.

Moreover, another object of the present invention is to provide a wireless terminal device, a wireless communication method, and a wireless communication system and program that do not require that both the receiving frequency and transmitting frequency be changed when switching between the trunking method and talk-around method.

In order to accomplish aforementioned objectives, the wireless terminal device of a first aspect of the present invention is a wireless terminal device that performs wireless communication with the wireless terminal device of another party via relay by a relay device or directly, comprising: communication permission request means (21, S101 to S104) for receiving a downlink signal that is transmitted from a pre registered specified relay device (home repeater) when requesting communication, specifying an idle channel based on idle channel information that is included in the downlink signal, and requesting communication permission from a relay device that provides the idle channel using the uplink frequency of the specified idle channel; and communication means (CPU 21, S118 to S131) that uses the same frequency as the frequency of the downlink signal from the specified relay device for transmitting a signal to the wireless communication terminal device of another party requesting communication when it is not possible to receive the communication permission from the relay device from which the communication permission was previously requested.

The communication means, for example, can further comprise a response receiving means (FIG. 2; receiving circuit 20, S121) for receiving a response from the wireless terminal device of another party. In this case, for example, the communication means comprises:

determining means (CPU 21, S122) for determining whether or not the response comes directly from the wireless communication terminal device of the other party and not via a relay device;

specification means (CPU 21, S130) for specifying a frequency that can be used when it is determined that the response is a direct response; and direct communication exchange means (CPU 21, S130) for setting the communication frequency to the specified usable frequency, and exchanging communication with the wireless communication terminal device of the other party.

The communication permission request means, for example, can include means for selecting an idle channel and resending the communication request (S107 to S109, S207 to S208, 203) based on idle channel information that is included in the downlink signal from the specified relay device when communication permission could not be received.

The communication means, for example, comprises means (S120) for matching the receiving frequency and transmitting frequency with the downlink frequency of the specified relay device and transmitting a signal to the wireless terminal device of the other party when communication permission could not be acquired and a downlink signal could not be received after transmitting a communication request (step S106: YES, step S107: NO).

The wireless terminal device can further comprise means (S218, 219) for waiting a set amount of time after communication permission has been received and the communication means transmits a signal when a downlink signal can be received from the specified relay device but no response is received from the terminal of the other party, and for executing a disconnection process when no response can be received even after waiting a set amount of time.

The wireless terminal device can further comprise means (20, 26) for determining the communication state and outputting information that indicates the communication state.

It is also possible to construct a wireless communication system comprising: a wireless terminal device as described above and a plurality of relay devices.

In order to accomplish the aforementioned objectives, a wireless communication method of a second aspect of the invention is a wireless communication method, comprising steps of:

transmitting a downlink signal from a relay device, the downlink signal including idle channel information;

a wireless terminal device receiving the downlink signal that was transmitted from the specified relay device (home repeater) when requesting communication, specifying an idle channel based on the idle channel information that is included in the downlink signal, and using the uplink frequency of the specified idle channel to request communication permission from the relay device that provides the idle channel, transmitting a permission signal to the relay device that provides the idle channel when allowing communication; and the wireless terminal device using the same frequency as the frequency of the downlink signal from the specified relay device to transmit a signal to the wireless communication terminal device of the other party when the communication permission could not be received from the relay device from which the communication permission was previously requested.

In order to accomplish the aforementioned objective, a computer program of a third aspect of the present invention is a computer program that causes a computer comprising a communication function to function as communication permission request means (21, S101 to S104) for receiving a downlink signal that is transmitted repeatedly from the pre registered specified relay device (home repeater), specifying an idle channel based on idle channel information that is included in the downlink signal, and requesting communication permission to a relay device that provides the idle channel using the uplink frequency of the specified idle channel to request communication permission; and communication request means (CPU 21, S118 to S131) that uses the same frequency as the frequency of the downlink signal from the specified relay device for transmitting a signal to the wireless communication terminal device of another party requesting communication when it is not possible to receive communication permission from the relay device from which the communication permission was previously requested.

Moreover, this program can be recorded on a recording medium and distributed or circulated.

EFFECT OF THE INVENTION

With the present invention, communication may become possible even when communication by the normal trunking method is not possible.

BRIEF DESCRIPTION OF DRAWINGS

FIG. 8 is a continuation of the flowchart of FIG. 7 showing the operation of the CPU;

BEST MODES FOR CARRYING OUT THE INVENTION

Embodiments of the wireless terminal device, wireless communication method, and wireless communication system and program of the present invention will be explained with reference to the accompanying drawings.

Figure 1:
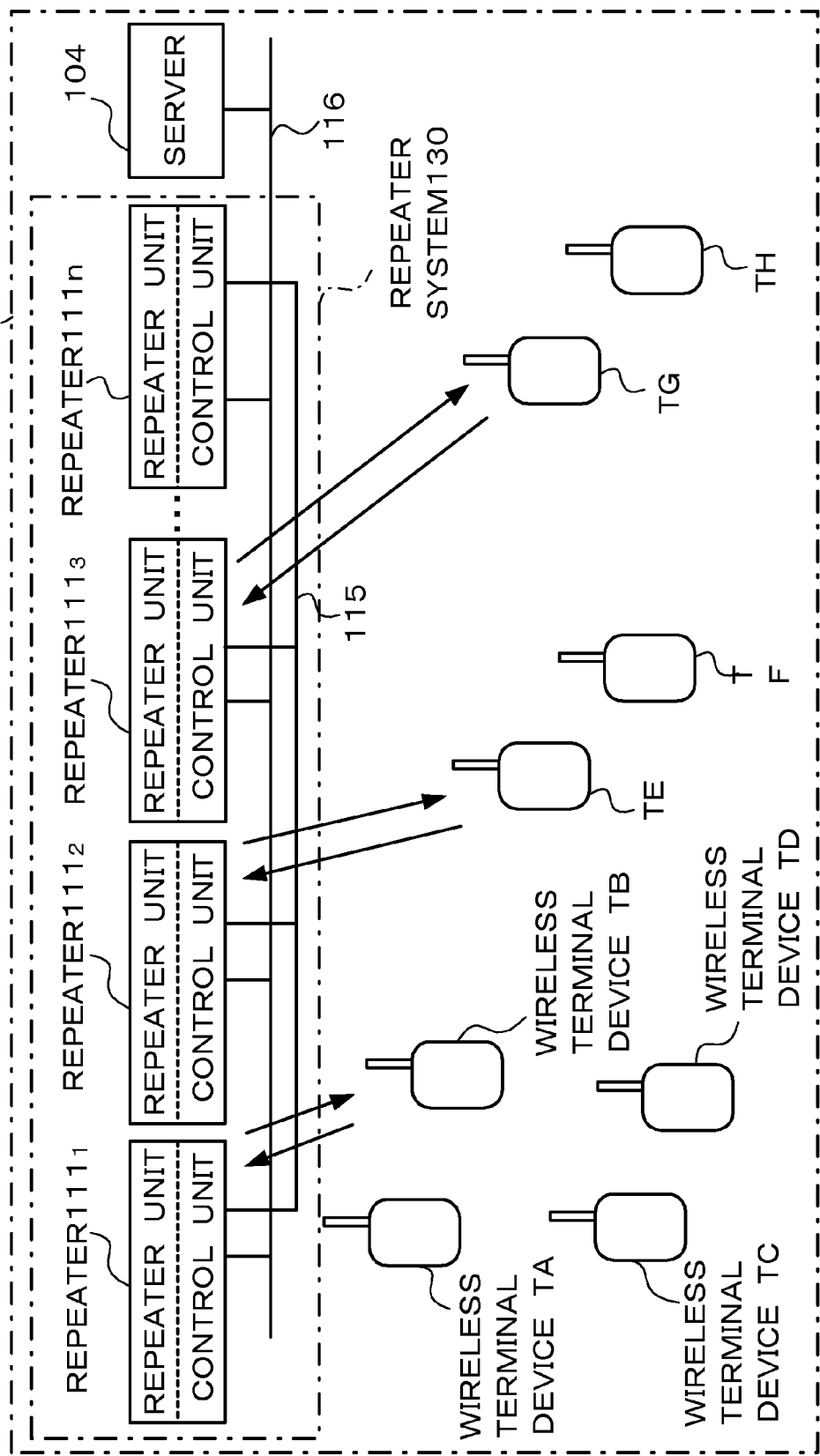
FIG. 1 is a configuration diagram showing a wireless communication system to which wireless terminal devices of a first and second embodiment of the present invention are applied.

As illustrated in FIG. 1, at the site 100 of the wireless communication system of one embodiment of the invention, a plurality (for example a maximum of 30) of repeaters $111_1$ to $111_n$ are connected via a communications line 115. Each of the plurality of repeaters $111_1$ to $111_n$ is assigned its own unique relay channel, and function to perform relay processing for the same communication area. The plurality of repeaters $111_1$ to $111_n$ that are connected by the communication line 115 form one repeater system (relay system) 130. That is, the repeater system 130 forms one communication area having n number of channels (n is the number of repeaters). Moreover, the repeater system 130 comprising a plurality of repeaters $111_1$ to $111_n$ is connected to a server 104 via a communication line 116 such as an IP connection line. Generally, the communication line 115 is called a "System Bus", so that in the explanation that follows, the communication line 115 will be called the system bus 115.

The server 104 is able to perform various settings of the plurality of repeaters $111_1$ to $111_n$ by remote operation. Each repeater $111_1$ to $111_n$ comprises a repeater unit and a controller unit. In addition, information about each repeater $111_1$ to $111_n$ (for example, whether or not such repeater is currently relaying) is exchanged and shared via the system bus 115. At which time slot data is to be transmitted to the system bus is set for each of the repeaters $111_1$ to $111_n$ beforehand. Therefore, each repeater $111_1$ to $111_n$ outputs data to the system bus 115 in the preset time slot.

One of the plurality of repeaters $111_1$ to $111_n$ is set as a "Master Repeater". Repeater $111_1$ of the plurality of repeaters $111_1$ to $111_n$ is explained as the master repeater in the following explanation. The master repeater transmits a synchronization signal for synchronizing all of the repeaters $111_1$ to $111_n$ including the master repeater itself to the system bus 115.

Each of the wireless terminal devices TA to TH registers any one repeater of the repeaters $111_1$ to $111_n$ as a home repeater. A wireless terminal device TA to TH in the standby mode receives a downlink signal from the home repeater. The wireless terminal device TA to TH acquires idle channel information that is inserted in the downlink signal from the home repeater, and shifts the channel frequency to that of the idle channel, and performs communication with another wireless terminal device. Moreover, after communication ends, returns the channel frequency to the channel frequency of the home repeater and returns to the standby mode. In FIG. 1, repeater $111_1$ is the home repeater for wireless terminal devices TA to TD, repeater $111_2$ is the home repeater for wireless terminal devices TE and TF, and repeater $111_3$ is the home repeater for wireless terminal devices TG and TH.

The wireless communication system in FIG. 1 is a distributed trunking system in which the wireless terminal devices TA to TH share the plurality of repeaters $111_1$ to $111_n$ and appropriately select at least one of those repeaters as a relay. The distributed trunking system does not have a dedicated channel for control, so that all of the channels function as control channels and communication channels. As an example, take the case in which the wireless terminal device TA performs communication with another wireless terminal TB to TD that is registered in the same home repeater. In this case, the wireless terminal device TA acquires channel information that is included in the downlink signal from its own home repeater, i.e., repeater $111_1$ and that indicates channels idle for communication, and based on the acquired channel information, determines which channels are idle for communication. The wireless terminal device TA selects one of the channels that were determined to be idle (for example, the channel provided by repeater $111_3$), and shifts its own channel frequencies (receiving frequency and transmitting frequency) to those of the selected channel.

Furthermore, the wireless terminal device TA transmits a communication permission request to this channel (repeater $111_3$), and establishes a link after receiving a response from the repeater $111_3$ that provides this channel indicating that the communication is allowed. The repeater $111_3$ requests home repeater $111_1$ via communication line 116 to call the wireless terminal TB to TD of the other party. The home repeater $111_1$ transmits a frame that includes a control signal that gives an instruction to shift to the communication channel (channel that repeater $111_3$ provides) for which the wireless terminal device TA established a link. The wireless terminal device TB to TD of the other party receives this control signal from the home repeater $111_1$, changes the channel frequency to that of the instructed channel, and performs communication with the wireless terminal device TA. In other words, the repeater $111_1$ operates as a control channel for the wireless terminal devices TA to TD that have registered repeater $111_1$ as a home repeater, and operates as a communication channel for the other wireless terminal devices TE to TH. Here, communication between wireless terminal devices TA to TD can be group communication between all of the wireless terminal devices TA to TD, or can be further broken down in group units, for example, group communication of a small group comprising wireless terminal devices TA and TB, or can be an "individual call" with only one wireless terminal device targeted.

Figure 2:
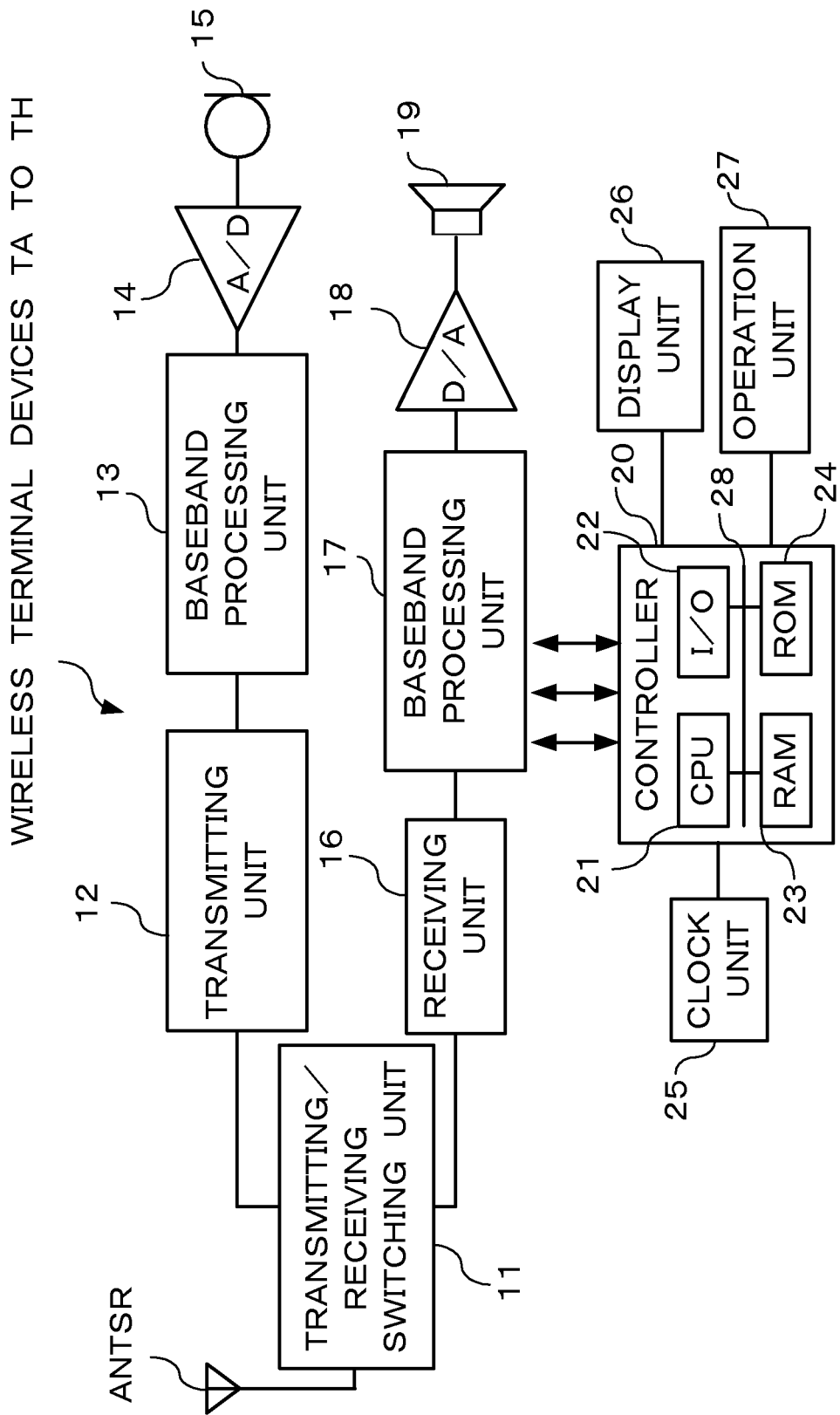
FIG. 2 is a block diagram illustrating the construction of the wireless terminal device in FIG. 1.
Figure 3:
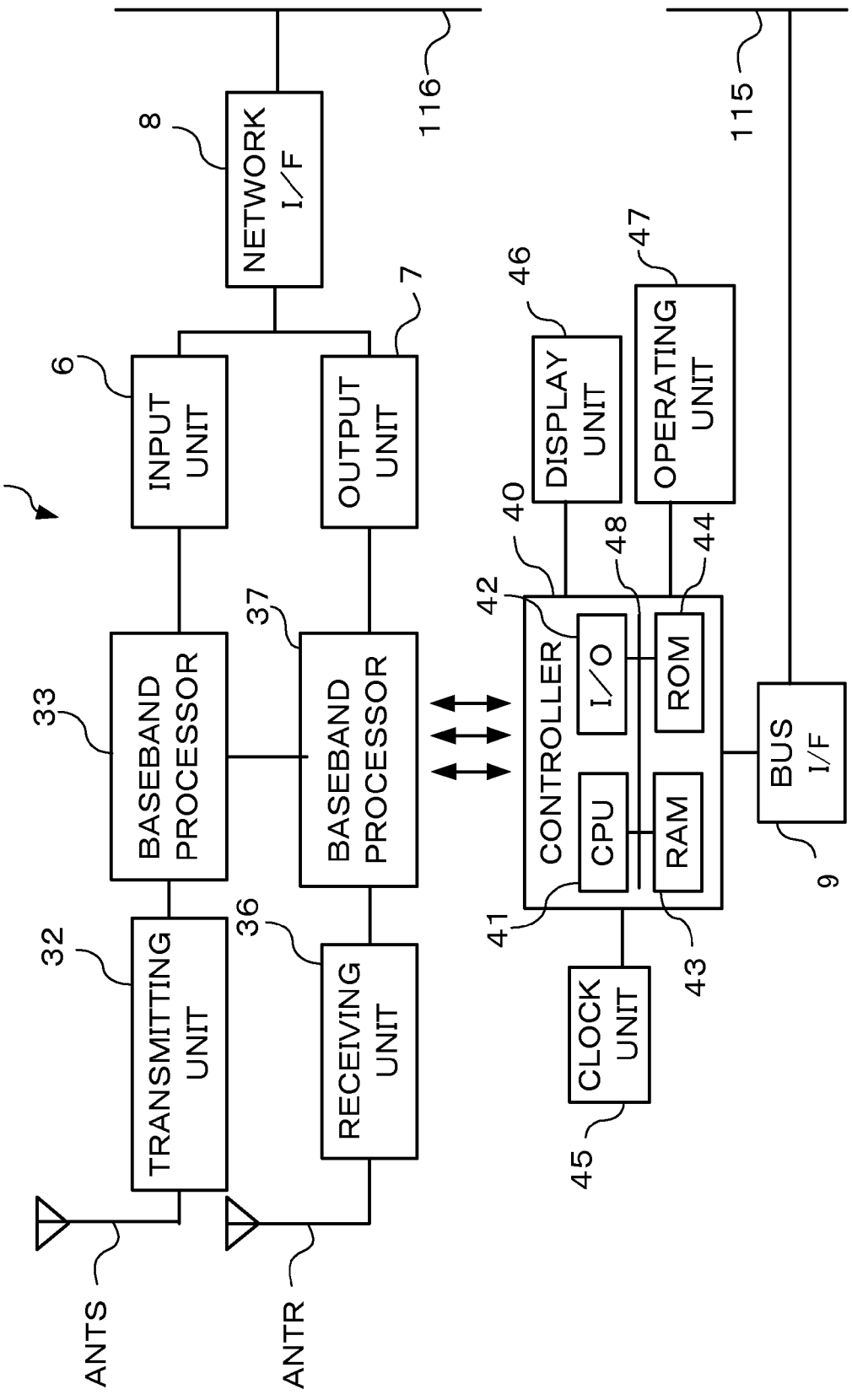
FIG. 3 is a block diagram showing the construction of the repeater in FIG. 1.
Figure 4:
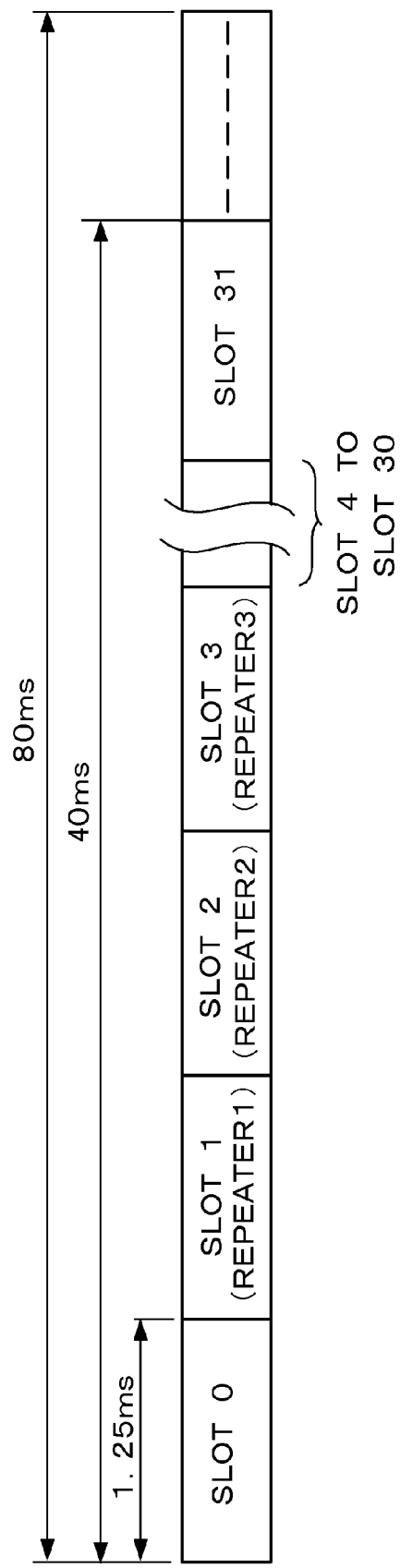
FIG. 4 is a diagram showing a synchronization signal that is sent from the master repeater 1 to the system bus, and timeslots following the synchronization signal that are assigned to the repeaters.

Next, the construction and function of the wireless terminal devices TA to TH and repeaters $111_1$ to $111_n$ will be explained. FIG. 2 is a block diagram illustrating the construction of the wireless terminal devices TA to TH in FIG. 1. FIG. 3 is a block diagram illustrating the construction of the repeaters $111_1$ to $111_n$ in FIG. 1. FIG. 4 is a diagram illustrating a synchronization signal transmitted to the system bus 115 from the master repeater $111_1$, and time slot which follow the synchronization signal and which is allocated to each repeater. FIGS. 5A and 5B are diagrams of the format of communication frames that are transmitted and received between the repeater and wireless terminal devices. The communication frame comprises a header section H and data section D. A detailed description of the header section H and data section D will be given later.

As illustrated in FIG. 2, the wireless terminal devices TA to TH, as a signaling system block, comprise: an antenna ANTSR, transmission/reception switching unit 11, transmitting unit 12, baseband processing unit 13, A/D conversion unit 14, microphone 15, receiving unit 16, baseband processor 17, D/A conversion unit 18 and speaker 19. In addition, the wireless terminal devices TA to TH, as a control system block, comprise: a controller 20, a clock unit 25, a display unit 26 and an operating unit 27. Furthermore, the controller 20 comprises: a CPU (central processing unit) 21, I/O (input/output unit) 22, RAM (random access memory) 23, ROM (read only memory) 24 and an internal bus 28 that connects these.

The CPU 21 controls the signaling system block of the wireless terminal devices TA to TH. The CPU 21 runs a control program stored in the ROM 24 to control the whole wireless terminal device, processes commands and data inputted from the operating unit 27 via the I/O 22, and data acquired from the baseband processor 17, and temporarily stores such data in RAM 23. In addition, the CPU 21, as needed, displays stored commands and data, or information indicating the current communication state on the display unit 26 comprising an LCD (Liquid Crystal Display). Moreover, the CPU 21 displays on the display unit 26 the current time that is acquired from the clock unit 25. The controller 20 can also be constructed such that a re-writable non-volatile memory card such as a flash memory is detachably mounted that stores ID information that is unique to the wireless terminal device.

The operating unit 27 comprises a PTT (Push To Talk) button. The PTT button is operated (pressed) when a user communicates, and gives an instruction to the CPU 21 to perform communication.

Next, in regards to the signaling system block, one end of the transmission/reception switching unit 11 is connected to an antenna ANTSR, the other end is connected to either the transmitting unit 12 or receiving unit 16 according to control from the CPU 21. When no transmission operation is made through the operating unit 27 (for example, the PTT (Push To Talk) button of the operating unit 27 has not been pressed), this wireless terminal device is in a receiving (standby) mode, and the output end of the transmission/reception switching unit 11 is connected to the receiving unit 16. On the other hand, when a transmission operation is made through the operating unit 27 (for example, the PTT (Push To Talk) button of the operation unit 27 has been pressed), this wireless terminal device is becomes a transmitting mode, and the output end of the transmitting/receiving switching unit 11 is connected to the transmitting unit 12.

When a wireless terminal device TA to TH is in the transmitting mode, the microphone 15 outputs an analog voice signal to the A/D conversion unit 14 according to voice input by the user.

The A/D conversion unit 14 converts an analog voice signal from the microphone 15 to a digital voice signal and outputs the digital voice signal to the baseband processing unit 13.

The baseband processing unit 13 generates a communication frame (baseband signal) having a specified format based on the digital voice signal from the A/D conversion unit 14, or based on data that is stored in the RAM 23 of the controller 20, and outputs that communication frame to the transmitting unit 12. As will be described later with reference to FIG. 5, an ID flag IF that indicates that the communication frame has been transmitted from the wireless terminal device is added to the communication frame.

The transmitting unit 12 modulates the carrier wave using the communication frame from the baseband processor 13, and transmits the result to the relaying repeater via the transmission/reception switching unit 11 and antenna ANTSR. The modulation method used by the transmitting unit 12 can be a method such as GMSK (Gaussian filtered Minimum Shift Keying), PSK (Phase Shift Keying), QAM (Quadrature Amplitude Modulation) and FSK (Frequency Shift Keying).

When the wireless terminal device TA to TH is in the receiving mode, the transmission/reception switching unit 11 connects the antenna ANTSR and the receiving unit 16. The receiving unit 16 receives a radio signal from the repeater $111_1$ to $111_n$ via the antenna ANTSR. The receiving unit 16, together with amplifying the received signal, performs signal processing such as demodulation processing, and outputs the demodulated signal to the baseband processor 17.

The baseband processor 17 extracts the communication frame from the demodulated signal that was output from the receiving unit 16. Furthermore, the baseband processing unit outputs the information of the header part H of the extracted communication frame to the CPU 21. The CPU 21 analyzes the information of the header section, and when the transmission destination of that received signal is its own station, has the voice signal data that is included in the data part D output to the D/A converter 18, temporarily stores data that is included in the data section D that is not of the voice signal in RAM 23, and when necessary displays data on the display unit 26. The D/A conversion unit 18 converts the digital voice signal from the baseband processor 17 to an analog voice signal, and outputs that signal from the speaker 19.

As illustrated in FIG. 3, each of the repeaters $111_1$ to $111_n$, as a signaling system block, comprises: a transmitting antenna ANTS, a transmitting unit 32, a baseband processor 33, a receiving antenna ANTR, a receiving unit 36, a baseband processor 37, an input unit 6, an output unit 7 and a network I/F (interface) 8. Moreover, each of the repeaters $111_1$ to $111_n$, as a control system block, comprises: a controller 40, a clock unit 45, a display unit 46 and an operating unit 47. Furthermore, the controller 40 comprises: a CPU (central processing unit) 41, I/O (input/output unit) 42, RAM (random access memory) 43, ROM (read only memory) 44 and an internal bus 48 that connects these components together. In addition, the repeaters $111_1$ to $111_n$ comprise a bus I/F (interface) 9 for transmitting information to the system bus 115 and for acquiring information from other repeaters.

A repeater $111_1$ to $111_n$ (for example repeater $111_1$) performs signal processing such as amplification processing and waveform processing of the radio signal that was received from the wireless terminal device that is the transmission departure (for example, wireless terminal device TA), and transmits the processed signal to the wireless terminal device that is the transmission destination (for example, wireless terminal device TB).

The repeaters $111_1$ to $111_n$ basically change the channel to a different channel (frequency and timeslot) from the receiving channel and perform transmission without changing the substance of the received communication frame. However, the value of the ID flag IF that is included in the communication frame is rewritten to indicate that the communication frame has been transmits from a wireless terminal device to the value to indicate that the communication frame is relayed by a repeater.

The repeaters $111_1$ to $111_n$ basically have the same construction as the wireless terminal devices TA to TH illustrated in FIG. 2. Therefore, the components that are basically the same as the components of the wireless terminal devices TA to TH illustrated in FIG. 2 will be expressed using the same reference numbers, and since the operation of those components is same as that of the wireless terminal devices TA to TH, an explanation of them is omitted.

When wireless terminal devices TA to TH communicate with each other via a repeater $111_1$ to $111_n$, the transmission uplink from the wireless terminal device to the repeater and the transmission downlink from the repeater to the wireless terminal device are performed essentially at the same time by changing the frequency or time slot. Therefore, the repeaters $111_1$ to $111_n$ comprise the antenna ANTS transmitting only and the antenna ANTR receiving only. In addition, as illustrated in FIG. 1, the plurality of repeaters $111_1$ to $111_n$ are connected to each other via a system bus 115, and connected to a server 104 via a communication line 116 such as an IP connection line.

According to control from the CPU 41, the input unit 6 inputs data that was supplied from the server 104 via the network I/F 8 and communication line 116, and supplies that data to the baseband processing unit 33. The output unit 7, according to control from the CPU 41, outputs data that is supplied from the baseband processing unit 37 to the server 104 via the network I/F 8 and communication line 116.

Furthermore, when building a multi-site network that performs communication with another site that forms a different communication area, the input unit 6 and output unit 7 transmit communication frames to or receive communication frames from a repeater of the other site via the network I/F 8. The bus I/F bus 9, according to input control from the CPU 41, acquires synchronization signals that are transmitted to the system bus by the master repeater, and repeater information that is sent to the system bus from a repeater other than its own, and according to output control from the CPU 41, relays the transmission of its own information to the system bus.

Moreover, the baseband processing unit 37, according to control from the CPU 41, reproduces the original data (communication frame) from the baseband signal that the receiving unit 36 received and demodulated, and supplies the result to the baseband processing unit 33.

The baseband processing unit 33, according to control from the CPU 41, changes the value of the ID flag IF that is included in the received communication frame to a value, for example "1", that indicates that the signal is from a repeater, then generates a baseband signal and outputs that baseband signal to the transmitting unit 32.

Next, the format of the signals that the wireless terminal system of this embodiment processes will be explained with reference to FIG. 4 and FIG. 5.

FIG. 4 illustrates the format of a synchronization signal that is transmitted on the system bus 115. This synchronization signal has a cycle of 80 ms, the first 40 ms comprises 32 slots from slot 0 to slot 31. Therefore, each slot has a time length of 1.25 ms. The first slot, slot 0, is a synchronization signal that is transmitted by one specific repeater, or in other words, the master repeater 111$_1$, according to a set algorithm, while the other repeaters 111$_2$ to 111$_n$ become slave repeaters and acquire this synchronization signal. The repeaters 111$_1$ to 111$_n$, or in other words, the repeater system 130, operate in synchronization with this synchronization signal. The slots other than slot 0 that is used for synchronization, or other words, slot 1 to slot 31, are assigned to the repeaters 111$_1$ to 111$_n$. Each of the repeaters 111$_1$ to 111$_n$ writes shared information for each repeater in the slot that is assigned to own device. The repeater 111$_1$ that is the master repeater transmits the synchronization signal to slot 0, and writes the information for repeater 111$_1$ (for example, information that indicates the idle state or relaying state) in the slot from among slot 1 to slot 31 that is assigned to repeater 111$_1$. The last slot 31 is used for connecting to an external device for future expansion.

FIG. 5A illustrates an example of format of a communication frame when establishing a link with a communication channel, and FIG. 5B illustrates an example of the format of a communication frame when performing voice and data communication. In FIG. 5A and FIG. 5B, the format of the communication frame is structured to be 384 bits in 80 ms. In addition, only during initial transmission, a preamble (P) that is 24 bits or greater is attached to the start. FSW is a frame synchronization word, LICH is a link information channel, SCCH is a signaling information channel for trunking control, and G is the guard time.

The LICH includes an ID flag IF for identifying whether the transmission frame is a frame that is transmitted from a wireless terminal device, or a communication frame that is transmitted by a wireless terminal device and retransmitted by a repeater. By determining the value of this ID flag, it is possible to determine whether the frame is a communication frame that was directly transmitted from a wireless terminal device, or is a communication frame that was redirected by a repeater.

Figure 6:
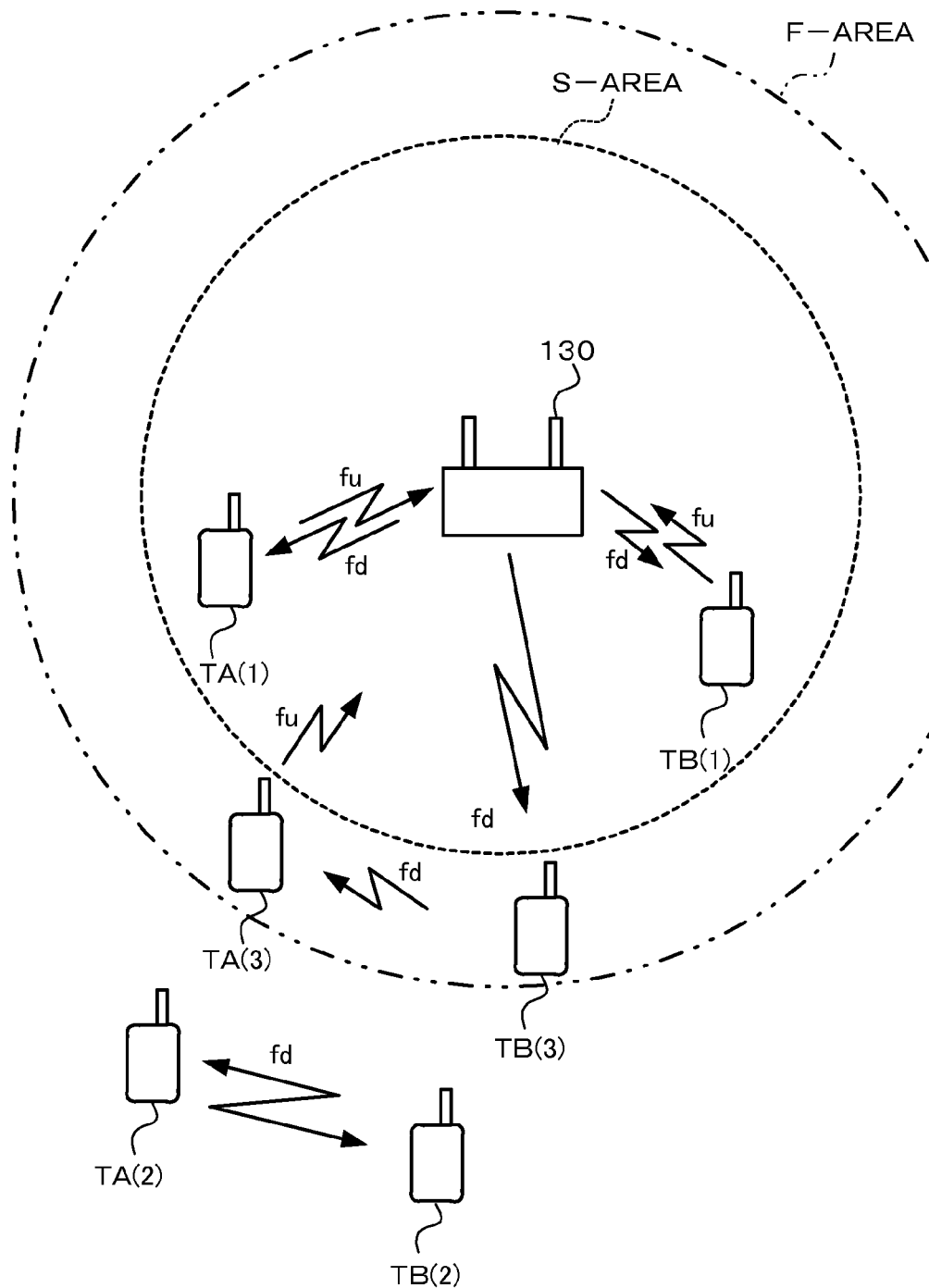
FIG. 6 is a diagram showing the positional relationship between the service area of a repeater in FIG. 1 and a wireless terminal device.
Figure 9:
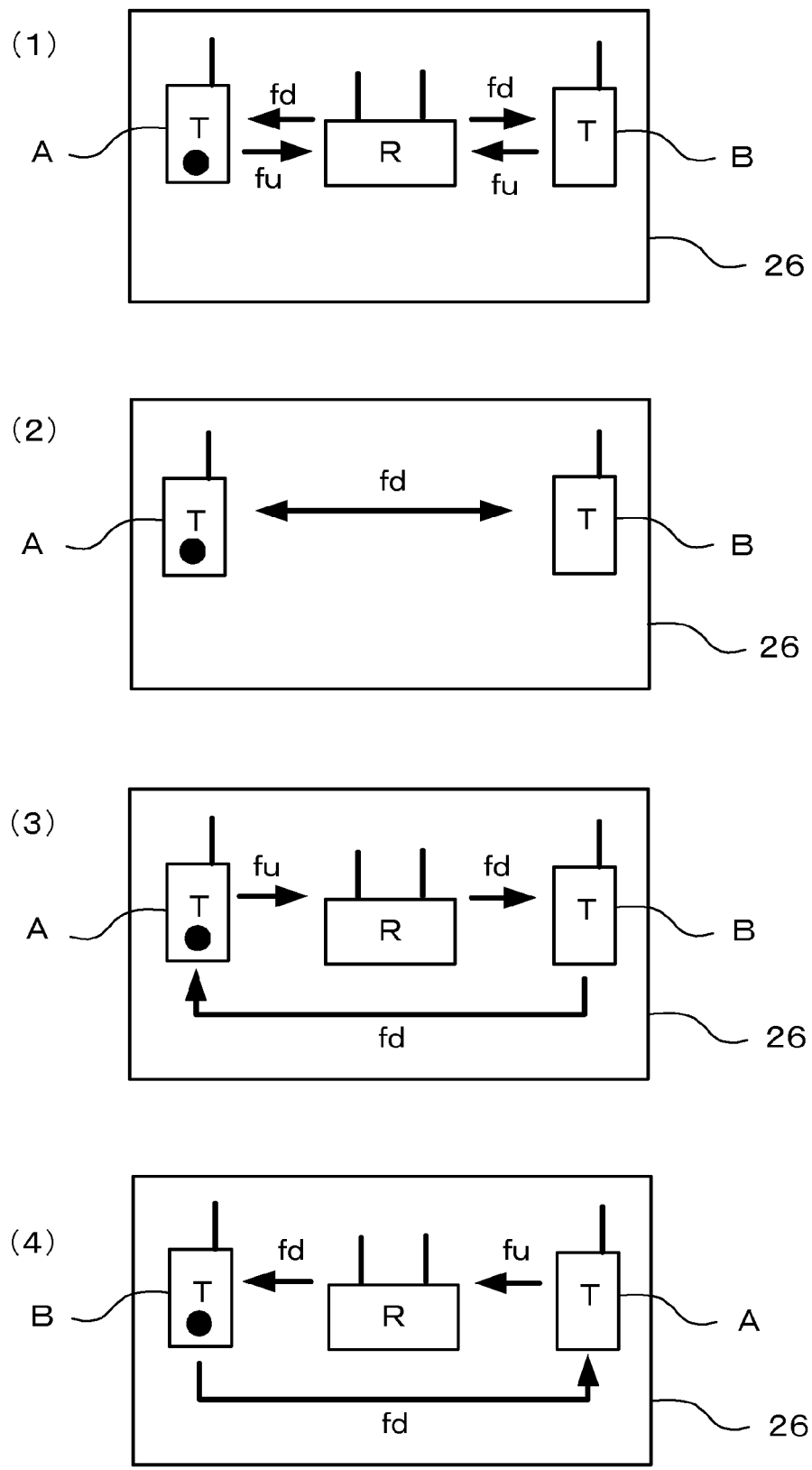
FIG. 9 is a diagram showing an image in the display section of the wireless terminal device of FIG. 2.

FIG. 6 is a diagram illustrating the state of the wireless terminal device TA and wireless terminal device TB performing communication through a relay by a repeater 111$_2$ of FIG. 1 or directly. FIGS. 7 and 8 are flowcharts illustrating operation of the wireless communication method that is executed by the CPU 21 of the wireless terminal device TA. FIG. 9 is a diagram illustrating an image on the display unit 26 of the wireless terminal devices TA, TB.

In FIG. 6, the dotted circle line (S-AREA) illustrates the service area of the repeaters 111$_1$ to 111$_n$. In the service area S-AREA the radio wave environment is good. On the other hand, on the outside of the service area and in the range (F-AREA) of the 2-dot dash ring shaped line is a fringe area in which the radio wave environment is unstable, and outside of the fringe area is an area where relay by the repeaters 111$_1$ to 111$_n$ is not possible, or in other words is an out of range area. In FIG. 6; however, the wireless terminal device TA and wireless terminal device TB acquire the idle channel information that is included in the downlink communication frame from the repeater 111$_1$, which is the home repeater, and set the repeater 111$_2$ as the communication channel to perform communication, where in order to avoid complication of the figure, the repeaters 111$_1$ to 111$_n$ are expressed as a repeater system 130, and wireless terminal devices other than wireless terminal device TA and wireless terminal device TB are omitted.

In the fringe area F-AREA, the downlink signal from the repeater 111$_2$ reaches the wireless terminal devices TA, TB; however, since the level of the uplink signals from the wireless terminal devices TA, TB is small, the uplink signals do not reach the repeater 111$_2$. In the out-of-range area outside the fringe area not only does the uplink signal from the wireless terminal devices TA, TB not arrive at the repeater 111$_2$, the downlink signal from the repeater 111$_2$ also does not reach the wireless terminal devices TA, TB.

In this case, the situation is presumed in which the wireless terminal device TA is a mobile type having a transmission power level that is relatively large, and the wireless terminal device TB is a portable type having a transmission power level that is small.

First, one wireless terminal device, for example, wireless terminal device TA(1), which is located in the service area, transmits an uplink signal having a frequency fu (for example 435.00 MHz) to the repeater 111$_2$, which functions as a communication channel based on idle channel information that was acquired from the downlink communication frame from the repeater 111$_1$ that is registered by the wireless terminal device TA and wireless terminal device TB as a home repeater, and requests communication. When the repeater 111$_2$ is idle for communication, the repeater 111$_2$ transmits a signal to the wireless terminal device TA(1) allowing communication, and transmits a request to the home repeater 111$_1$ of the wireless terminal device TB(1) requesting that the wireless terminal device TB(1) shifts the communication channel to the communication channel that the repeater 111$_2$ provides. In response to the signal allowing communication, the wireless terminal device TA(1) transmits an uplink signal that includes communication data. After receiving the uplink signal from the wireless terminal device TA(1), the repeater 111$_2$ converts the frequency fu to the downlink signal that was shifted to frequency fd (for example, 440.00 MHz), performs amplification processing and other necessary signal processing, and transmits the signal to the other wireless terminal device TB(1). On the other hand, the repeater 111$_1$ responds to the request from the repeater 111$_2$, and transmits a control signal to the wireless terminal device TB(1) giving an instruction to shift the communication channel to the communication channel that the repeater 111$_2$ provides. In response to this, the wireless terminal device TB(1) turns in the communication channel to the frequency of the channel that the repeater $111_2$ provides.

Similarly, when performing communication, the wireless terminal device TB(1) transmits an uplink signal having frequency fu to the repeater $111_2$, the repeater $111_2$ converts that uplink signal to a downlink signal having a frequency fd, and transmits the signal to the wireless terminal device TA(1). In other words, in the service area, the wireless terminal device TA(1) and wireless terminal device TB(1) can perform trunking type communication through a relay by the repeater $111_2$.

The wireless terminal device TA(2) and wireless terminal device TB(2) that are located out-of-range do not go through the repeater $111_2$, and as will be explained later, transmit and receive radio signals having a frequency fd that is the same as the frequency of the downlink signal from the repeater $111_1$, that is registered by the wireless terminal device TA and wireless terminal device TB, and perform talk-around type communication. In other words, the wireless terminal device TA(2) and wireless terminal device TB(2) change the frequency fu of the transmission signal in trunking type communication to the frequency fd of the downlink signal from the home repeater $111_1$, and maintain as is the frequency fd of the downlink signal from the home repeater $111_1$ for the frequency of received signals. However, the frequency of the transmission signals of the wireless terminal device TA(2) and wireless terminal device TB(2) that are located out-of-range is taken to be the frequency fd of the downlink signal from the repeater $111_2$, and for receiving a signal may be maintained at the frequency fd. As will be described later, this is the operation in the case when the wireless terminal device TA and wireless terminal device TB that are communicating move from the service area of the repeater $111_2$ to an area out-of-range. In this way, when the wireless terminal device TA and wireless terminal device TB are out-of-range of the service area of a trunking system and are communicating directly without a relay by a repeater, the frequency of a transmitted signal and the frequency of a received signal is not limited to the frequency of the downlink signal from the repeater $111_2$. In short, the frequency of transmitted signals and the frequency of received signals of the wireless terminal device TA and wireless terminal device TB only need to match the frequency of an idle channel when out-of-range.

In wireless terminal device TA(3) and wireless terminal device TB(3) that are located in the fringe area, the mobile type wireless terminal device TA(3) has relatively large transmission power, so is capable of transmitting wireless signals to and receiving wireless signals from the repeater $111_2$. That is, the wireless terminal device TA(3) can transmits uplink signals having a frequency fu to the repeater $111_2$, and can receive downlink signals having a frequency fd from the repeater $111_2$. On the other hand, a battery-operated portable type wireless terminal device TB(3) has low transmission power, so can receive downlink signals having a frequency fd from the repeater $111_2$; however, is unable to transmitted uplink signals having a frequency fu.

In other words, the communication state of the wireless terminal device TA and wireless terminal device TB as mobile stations changes according to the positional relationship with the repeater $111_2$ and difference in transmission power level.

Next, the communication operation of the wireless terminal devices TA to TH of a first embodiment will be explained with reference to the flowchart in FIGS. 7A and 7B and FIG. 8 of the processing executed by the CPU 21 in FIG. 2 and reference to FIG. 9.

Here, in the case where communication is started between the wireless terminal device TA and the wireless terminal device TB by performing a call from the wireless terminal device TA to the wireless terminal device TB, the processing by the wireless terminal device TA side will be explained. Communication between the wireless terminal device TA and wireless terminal device TB is performed via any of repeaters $111_2$ to $111_n$ other than the home repeater $111_1$. When one transmission via any of repeaters $111_2$ to $111_n$ is finished, (in the case of voice communication, the instant when operation of the operating unit 27 (typically a PTT switch) is released), the communication channel of the wireless terminal devices TA and TB returns to the communication channel that the home repeater $111_1$ provides. FIG. 9 is an icon image displayed on the display unit 26 of the wireless terminal device TA. In FIG. 9, T represents the wireless terminal device TA and R represents the repeater 111. A wireless terminal device T on its own station side is identified by a mark (black dot in the figure).

Figure 7A:
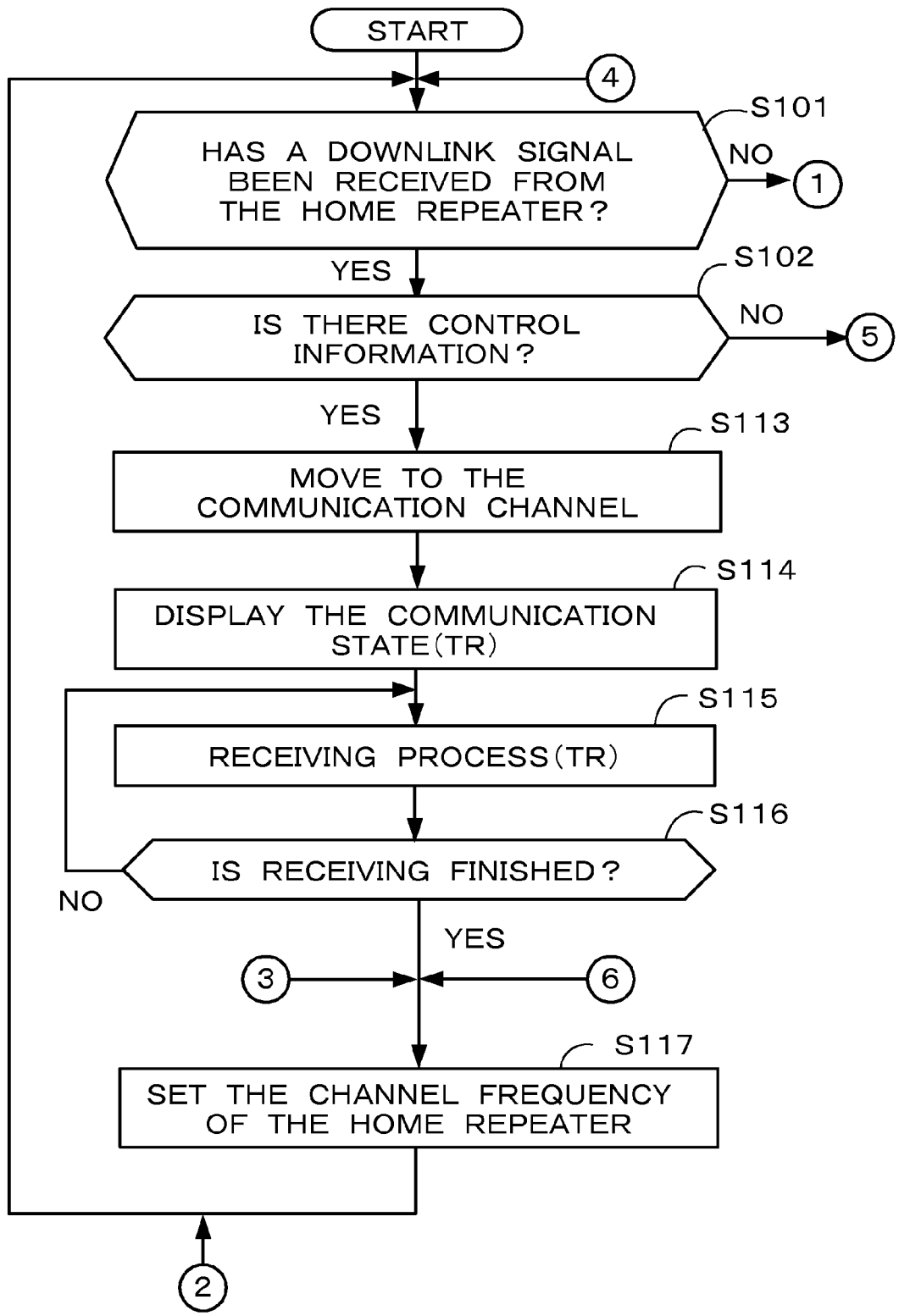
FIG. 7 is a flowchart showing the operation of a CPU of a wireless terminal device in FIG. 2 of the first embodiment.
Figure 7B:
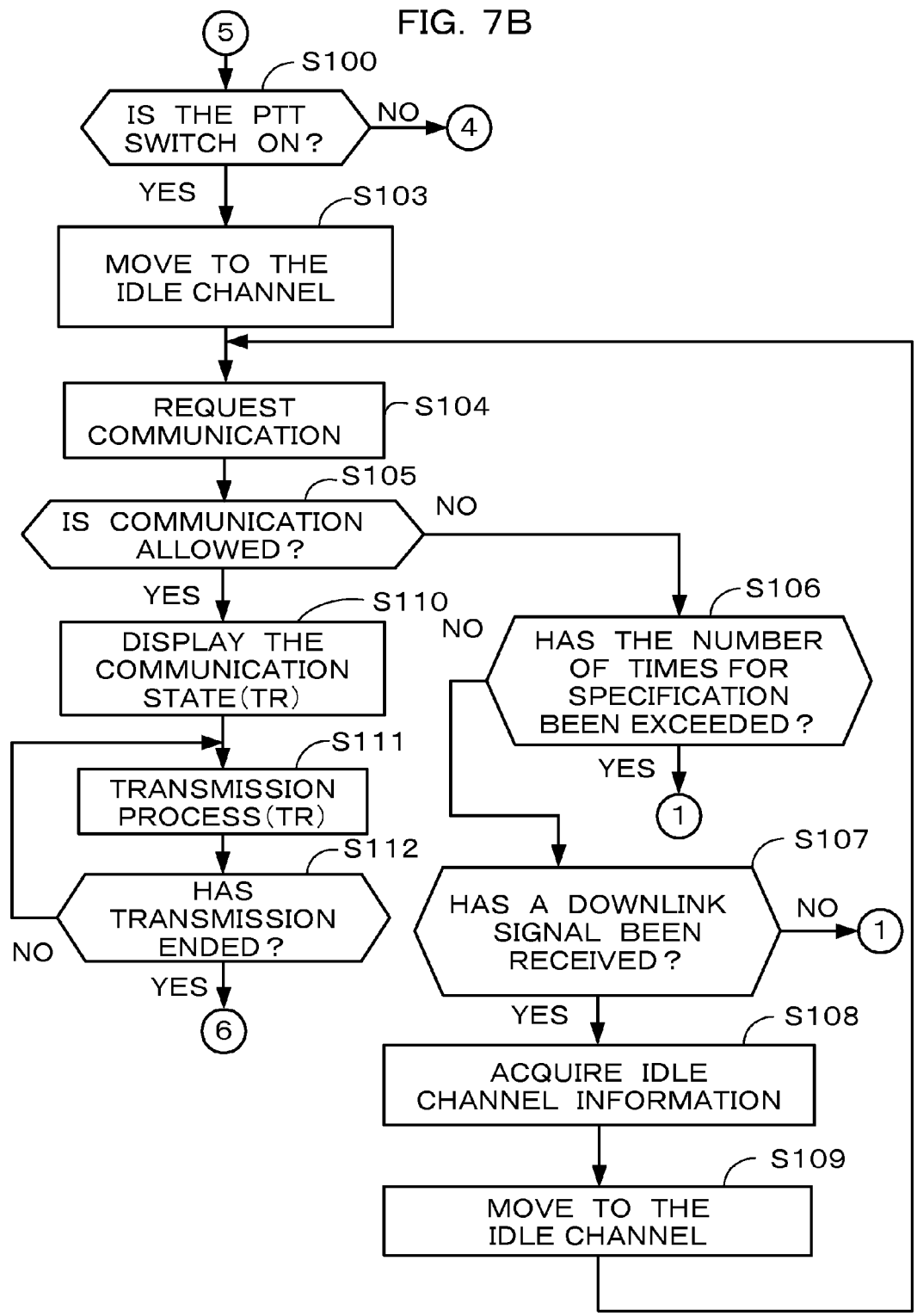

When the power to the wireless terminal device TA is turned ON, the CPU 21 starts the processing illustrated in the flowchart of FIGS. 7A and 7B and FIG. 8.

First, the CPU 21 of the wireless terminal device TA determines whether or not a communication frame of a downlink signal from the repeater $111_1$, which is the home repeater, has been received (step S101). When the CPU 21 determines that a downlink signal has been received (step S101: YES), the CPU 21 then determines whether or not that downlink signal is control information (step S102). When the downlink signal received is not a control signal (step S102: NO), the CPU 21 acquires idle channel information that is included in the downlink signal, and writes that information in RAM 23.

Continuing, the CPU 21 determines whether or not the PTT switch of the operating unit 27 is pressed, or in other words, determines whether or not a communication instruction has been transmitted (step S100). When the PTT switch has not been pressed (step S100: NO), the CPU 21 returns to step S101. On the other hand, when the PTT switch is being pressed (step S100: YES), the CPU 21 shifts the communication frequency to the channel frequency of the idle channel based on information stored in RAM 23 (step S103), and transmits a communication permission request (step S104).

Next, the CPU 21 determines whether or not a response allowing communication has been received from the repeater to which the communication permission request was transmitted (step S105), and when a response allowing communication has been received (step S105: YES), the CPU 21 displays on the display unit 26 that the communication state is trunking type communication via the repeater 111 (step S110), and executes transmission processing (step S111).

In FIG. 9, (1) is an icon image illustrating the trunking type communication state. The CPU 21 determines whether or not transmission processing has ended (step S112) (determines whether or not the PTT switch has been released), and when transmission processing has ended (step S112: YES), returns the channel frequency to the channel frequency of the repeater $111_1$, which is the home repeater (step S117), and receives downlink signals from the home repeater.

In step S102, when control information has been received (step S102: YES), the CPU 21 shifts the channel frequency based on the control information (step S113), displays on the display unit 26 that communication state is trunking type communication via a repeater (step S114) and executes the receiving process (step S115). Continuing, the CPU 21 determines in step S116 whether or not receiving has ended (determines whether or not "TX_REL", which indicates that the PTT switch of the wireless terminal device on the transmission side has been released, is included in the downlink communication frame from the repeater), and when receiving has ended (step S116: YES), returns the channel frequency to the channel frequency of the repeater $111_1$, which is the home repeater (step S117), and receives downlink signals from the home repeater. When in the coverage area of site 100, the CPU 21 repeats the transmitting and receiving as described above, and performs communication with the wireless terminal device of the communicating party.

When attempting to perform communication, fundamentally communication is not possible when in the fringe area F-AREA or out-of-range. However, with this embodiment, communication is temporarily performed using the downlink frequency of the home repeater. The wireless terminal device, which will become the intended party, is basically a wireless terminal device that is registered in the same home repeater. The wireless terminal device, in the standby state, receives downlink signals from the home repeater, and each time one transmission and reception ends, or in other words, when the PTT switch is released, returns to the channel frequency of the home repeater. In attempting to perform communication, the wireless terminal device shifts to an idle channel that is included in the downlink signal from the home repeater, and transmits a communication permission request many times; however, when no response allowing communication can be received, there is a high possibility that the wireless terminal device is in the fringe area (when the number of times has exceeded a specified number in step S106), and even when the predetermined number in step S106 has not been exceeded, when it is not possible to receive a downlink signal (step S107: NO), there is a high possibility that the wireless terminal device is out-of-range.

At this time, the other party receives a downlink signal from the home repeater as long as that other party is not in the progress of communicating with another wireless terminal device via a repeater other than the home repeater. Therefore, by transmitting a communication frame from a wireless terminal device that is in the fringe area F-AREA or out-of-range at the frequency of the downlink signal of the home repeater, there is a possibility that the communication frame can be transmitted to the intended other party. For example, even when the wireless terminal device of the other party is out-of-range and a downlink signal from the repeater $111_1$ is out of reach, when the distance between the wireless terminal devices is close, communication between the wireless terminal devices is possible by directly sending and receiving communication frames to each other by temporarily using the downlink frequency of the home repeater, and the wireless terminal device that is out-of-range can notify the other party that it is out-of-range.

With this as a premise, when the judgment result is YES in step S106 and NO in step S107 (in other words, when communication permission cannot be received even though a communication request has been transmitted, and no downlink signal can be obtained), the CPU 21 sets the transmission frequency to the downlink frequency of the home repeater (in other words, sets both the transmission frequency and receiving frequency to the downlink frequency of the home repeater) (step S118), displays on the display unit 26 an icon indicating the communication state (FIG. 9(2)) (step S119), executes normal processing of transmitting communication frames (FIG. 5(A), (B)) (step S120), and waits for a response from the wireless terminal device TB on the side of the intended party.

In this case, it is not clear where the wireless terminal device TB of the other party is; however, supposedly after receiving a radio signal that is transmitted directly from the wireless terminal device TA, the wireless terminal device TB transmits a wireless response signal. This response signal is transmitted to the wireless terminal device TA via a repeater or directly.

After receiving a response from the wireless terminal device TB (step S121: YES), the wireless terminal device TA determines from the ID flag IF in the received frame whether the received frame is a communication frame via a repeater, or a frame that was transmitted directly (step S122). The CPU 21 displays an image indicating the determined communication state (steps S123, 126).

For example, when the frame is received via a repeater, the image (3) in FIG. 9 is displayed in step S123, and when the frame is not from a repeater, then the image (2) in FIG. 9 is displayed in step S126. When the received frame is a communication via a repeater (step S122: YES), the CPU 21 displays on the display unit 26 an image (for example the image (3) of FIG. 9) indicating the determined communication state (step S123). Next, the CPU 21 continues receiving the communication frame that corresponds to a response (step S124), and when reception ends (step S125: YES), control returns to step S101.

On the other hand, when the received frame is not a communication frame via a repeater (step S122: NO), the CPU 21 displays on the display unit an image (for example, image (2) of FIG. 9) that indicates the determined communication state (step S126). Next, the CPU 21 continues receiving the communication frame corresponding to the response (step S127), and when reception ends (step S128: YES), the CPU 21 determines whether or not communication has ended (step S129), and when communication has ended (step S129: YES), returns to step S101.

However, when communication has not ended (step S129: NO), the CPU 21 performs communication at a frequency for which communication is possible. (steps S130, S131).

In other words, in the case of direct communication not via a repeater, there is a possibility of interference of communication between other wireless terminal devices, so that it is not possible to continuously use the downlink frequency of the home repeater. Therefore, the CPU 21 searches for a usable frequency, and performs communication using that frequency (step S130). The usable frequency can be, for example, a preset frequency, or can be a frequency at which a signal cannot be received when scanning receiving frequencies.

After that, when communication ends (step S131: YES), the processing flow advances to step S117.

As was explained above, with the wireless communication system of this embodiment, it is possible to maintain good communication quality when wireless terminal devices having a difference in transmission power level communicate, and when in an area where the radio signal environment is unstable. In addition, when switching between the trunking method and talk-around method, it is not necessary to change both the receiving frequency and transmitting frequency, so that it is possible to shorten the switching time, and to maintain good communication quality without the fear of communication becoming disrupted. Furthermore, when located in the fringe area on the boundary between the service area of a repeater and an out-of-range area, even when the transmission power level of the wireless terminal device of the intended other party is low and communication is not possible by the trunking method, it is not necessary to maintain an idle channel when the wireless terminal device of the intended other party is restored to the service area, and it is possible to maintain good communication quality without performing a relay in order to maintain an idle channel.

Second Embodiment

Figure 10B:
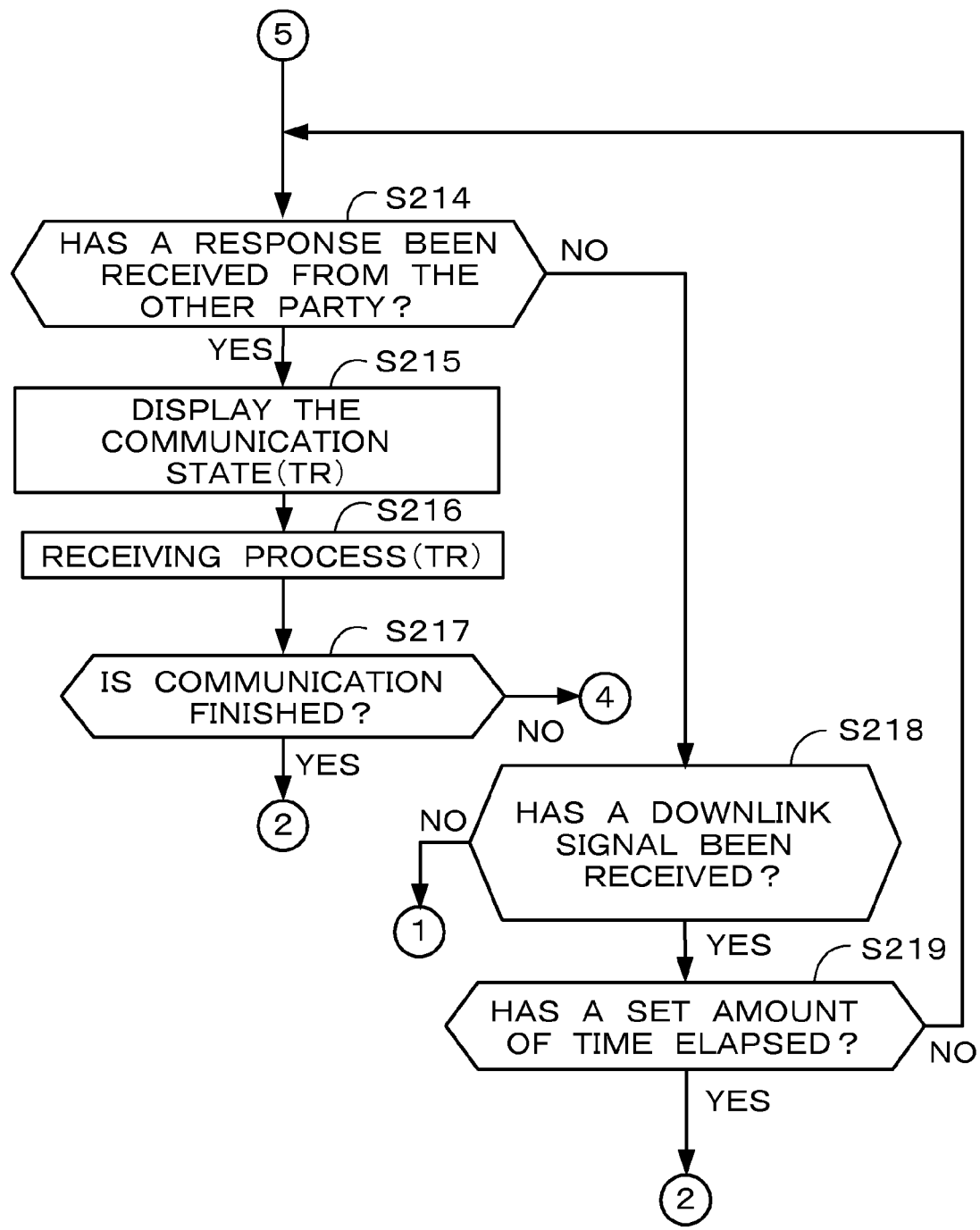
FIG. 10 is a flowchart showing the operation of a CPU of a wireless terminal device in FIG. 2 of the second embodiment.

Next, the operation that is executed by the CPU 21 of FIG. 2 for the wireless terminal devices TA to TH of a second embodiment of the present invention will be explained with reference to the flowchart in FIGS. 10A and 10B and FIG. 11, and with reference to FIG. 9. In this second embodiment as well, the processing on the side of the wireless terminal device TA will be explained for the case in which the wireless terminal device TA calls the wireless terminal device TB to start communication between the wireless terminal device TA and wireless terminal device TB.

Communication between the wireless terminal device TA and wireless terminal device TB is performed via any of repeaters $111_2$ to $111_n$ other than the home repeater $111_1$. After one time of transmission via any of the repeaters $111_2$ to $111_n$, or in other words, in the case of voice communication, at the instant that operation of the operation unit 27 (typically the PTT switch), is released, communication returns from the communication channel to the home repeater $111_1$. FIG. 9 is an icon image displayed on the display unit 26 of the wireless terminal device TA. In FIG. 9, T represents the wireless terminal device TA, and R represents the repeater 111. A wireless terminal device TA on its own station side is identified by a mark (black dot in the figure).

First, the process of establishing communication will be explained. The CPU 21 of the wireless terminal device TA repeatedly executes the process illustrated in FIGS. 10A and 10B and FIG. 11.

First, when in the standby mode, the CPU 21 receives a downlink signal from the home repeater (repeater $111_1$) that is registered by the wireless terminal device TA in a separate process. The CPU 21 determines whether or not the communication frame of a downlink signal was received from the home repeater (step S200), and when a downlink signal was received, acquires idle channel information from the communication frame of that downlink signal and stores the information in RAM 23.

Continuing, the CPU 21 determines whether or not the PTT button has been pressed (step S201), and when the PTT button has not been pressed (step S201: NO), the CPU 21 determines whether or not the wireless terminal device itself has been called, and when it is called, performs specified receiving processing (for example, processing similar to steps S113 to S117).

When the PTT button has been pressed (step S201: YES), the CPU 21 reads the idle channel information from RAM 23, and shifts to the frequency of the communication channel of the repeater $111_2$, which is the idle channel (step S202). Next, the CPU 21 of the wireless terminal device TA transmits a communication permission request to the repeater $111_2$ (step S203).

The CPU 21 of the wireless terminal device TA determines whether or not a response is received from the repeater $111_2$ allowing communication (step S204), and when there is no response from the repeater $111_2$ allowing communication (step S204: NO), the CPU 21 determines whether or not a downlink signal is received from the repeater $111_2$ (step S205). When a downlink signal is received from the repeater $111_2$ (step S205: YES), the CPU 21 compares the number of times a communication permission request was transmitted (number of continuous tries) with a preset specified number of times, and determines whether or not the number of times a communication permission request was transmitted exceeds the specified number (step S206).

When the consecutive number of times a communication permission request was transmitted is equal to or fewer than a specified number of times (step S206: NO), the CPU 21 acquires idle channel information from the communication frame of the downlink signal from the repeater $111_2$ for another wireless terminal device (step S207), then shifts the channel frequency to the frequency of that idle channel (step S208) and transmits a communication permission request in step S203.

In other words, when the result of the judgment in step S205 is YES, and the result in step S206 is NO, the repeater $111_2$ is already being used as a communication channel between other wireless terminal devices, or is transmitting a response allowing communication to another wireless terminal device, so that the CPU 21 acquires the idle channel information included in the received downlink signal and changes the channel frequency. Therefore, the CPU 21 of the wireless terminal device TA repeats the processing loop from step S203 to step S208 until a response is received from the repeater $111_2$ allowing communication.

When a response is received from the repeater $111_2$ allowing communication (step 204: YES), the CPU 21 displays on the display unit 26 that the communication state is the trunking method (step S209), and executes the transmitting process of the trunking method (step S210). In other words, the CPU 21 shifts to the process for establishing communication. FIG. 9(1) is an icon image that indicates the trunking communication state. After communication has been established, the CPU 21 determines whether or not communication has ended (step S211), and when communication has ended (step S211: YES), performs the disconnection process (step S212), moves to the channel frequency of the home repeater, and determines in step S200 whether or not a downlink signal was received from the home repeater.

In step S205, when a downlink signal is not received (step S205: NO), the wireless terminal device TA is presumed to be located out-of-range. In addition, in step S206, when the number of times that a communication permission request has been transmitted exceeds a specified number of times (step S206: YES), the wireless terminal device TA is presumed to be located in the fringe area F-AREA. In this case, the CPU 21 determines whether or not the number of times that communication permission has been received is one time or more (step S213). When the number of times that communication permission has been received is not even one time (step S213: NO), the CPU 21 performs the disconnection process (step S212), shifts to the channel frequency of the home repeater, and in step S200 determines whether or not a downlink signal was received from the home repeater.

In step S211, when communication has not ended (step S211: NO), the CPU 21 determines whether or not a response has been received from the other party, or in other words, wireless terminal device TB (step S214), and when a response has not been received from the wireless terminal device TB (step S214: NO), determines whether or not a downlink signal has been received from the repeater $111_2$ (step S218). When a downlink signal has been received from the repeater $111_2$ (step S218: YES), the CPU 21 determines whether or not a set amount of time has elapsed (step S219). For example, presuming that it takes time for the user of the wireless terminal device TB to send a response, or that the wireless terminal device has temporarily moved into the fringe area or out-of-range, the CPU 21 waits a set amount of time to receive a response. When the set amount of time has not elapsed (step S219: NO), the CPU 21 determines in step S214 whether or not a response has been received from the wireless terminal device TB.

In other words, when the CPU 21 of the wireless terminal device TA is no longer able to receive a response from the wireless terminal device TB while in the progress of communicating with the wireless terminal device TB, as long as a downlink signal is received from the repeater 111$_2$, the CPU 21 repeats the process loop of steps S214, S218 and S219 and waits for a response from the wireless terminal device TB until the set amount of time elapses.

In step S219, when the set amount of time has elapsed (step S219: YES), the CPU 21 determines that communication with the wireless terminal device TB is no longer possible using the trunking method and performs the disconnection process (step S212), shifts to the frequency of the downlink signal from the home repeater, and in step S200 determines whether or not a downlink signal has been received from the home repeater.

In step S214, when a response is received from the wireless terminal device TB (step S214: YES), the CPU 21 displays on the display unit 26 the trunking communication state (step S215), and executes trunking type transmission processing (step S216). After that, the CPU 21 determines whether or not communication has ended (step S217), and when communication has ended (step S217: YES), performs the disconnection process (step S212), shifts to the frequency of the downlink signal from the home repeater, and in step S200 determines whether or not a downlink signal has been received from the home repeater. When communication has not ended (step S217: NO), the CPU 21 requests communication permission in step S203.

When a downlink signal is received from the repeater 111$_2$ (step S205: YES); however, when the number of consecutive times that a communication permission request has been transmitted exceeds a specified number of times (step S206: YES), and in step S213 when the number of times that communication permission has been received is one time or more (step S213: YES), it is presumed that the wireless terminal device TA which is its own station is moving in the fringe area F-AREA during communication with the wireless terminal device TB. When a downlink signal is not received from the repeater 111$_2$ (step S205: NO), and in step S213 the number of times that communication permission has been received is one time or more (step S213: YES), it is presumed that the wireless terminal device TA which is its own station has moved into the fringe area F-AREA during communication with the wireless terminal device TB.

Moreover, in step S218, when a downlink signal is not received from the repeater 111$_2$ (step S218: NO), it is presumed that the wireless terminal device TA has moved out-of-range while communicating with the wireless terminal device TB; however, the status of the wireless terminal device TB is unclear. However, both the wireless terminal device TA and wireless terminal device TB are communicating via the repeater 111$_2$, so are both in a state in which the channel frequency is set to the channel frequency of the repeater 111$_2$. In other words, from the positional relationship with the wireless terminal device TB, direct communication is possible, and communication becomes possible by the wireless terminal device T on the transmitting side (here this is wireless terminal TA) transmitting to the wireless terminal device T on the side of the other party (receiving side) using frequency fd. Therefore, as described above, when it is presumed that the wireless terminal device TA has moved into the fringe area F-AREA or out-of-range during communication, the CPU 21 of the wireless terminal device TA changes the transmitting frequency from the uplink frequency fu to the repeater 111$_2$ to the downlink frequency fd, or in other words, sets the transmitting frequency and receiving frequency both to the frequency fd of the downlink signal (step S220 in FIG. 11). That is, the wireless terminal device TA makes the transition from the trunking method to the talk-around method of communication. In addition, the CPU 21 displays on the display unit 26 the talk-around communication state (step 221), and performs the transmission process (step S222). FIG. 9(2) is an icon image illustrating the talk-around communication state.

Next, the CPU 21 determines whether or not a response is received from the other party, or in other words, the wireless terminal device TB (step S223). When a response has been received from the wireless terminal device TB (step S223: YES), communication has been established. Next, the CPU 21 determines whether or not the establishment of communication is via the repeater 111$_2$ (step S224). When communication was established via the repeater 111$_2$ (step S224: YES), the CPU 21 displays on the display unit 26 the combined communication state (step S225), and performs the receiving process using this combined method (step S226). FIG. 9(3) is an icon image illustrating this combined communication state.

Next, the CPU 21 determines whether or not communication has ended (step S227), and when communication has ended (step S227: YES), performs the disconnection process (step S212 in FIG. 10A), shifts to the frequency of the downlink signal from the home repeater, and in step S200 determines whether or not a downlink signal has been received from the home repeater. Moreover, in step S223, even when a response is not received from the wireless terminal device TB (step S223: NO), the CPU 21 performs the disconnection process (step S212 in FIG. 10A), shifts to the frequency of the downlink signal of the home repeater, and in step S200 determines whether or not a downlink signal has been received from the home repeater.

Figure 11:
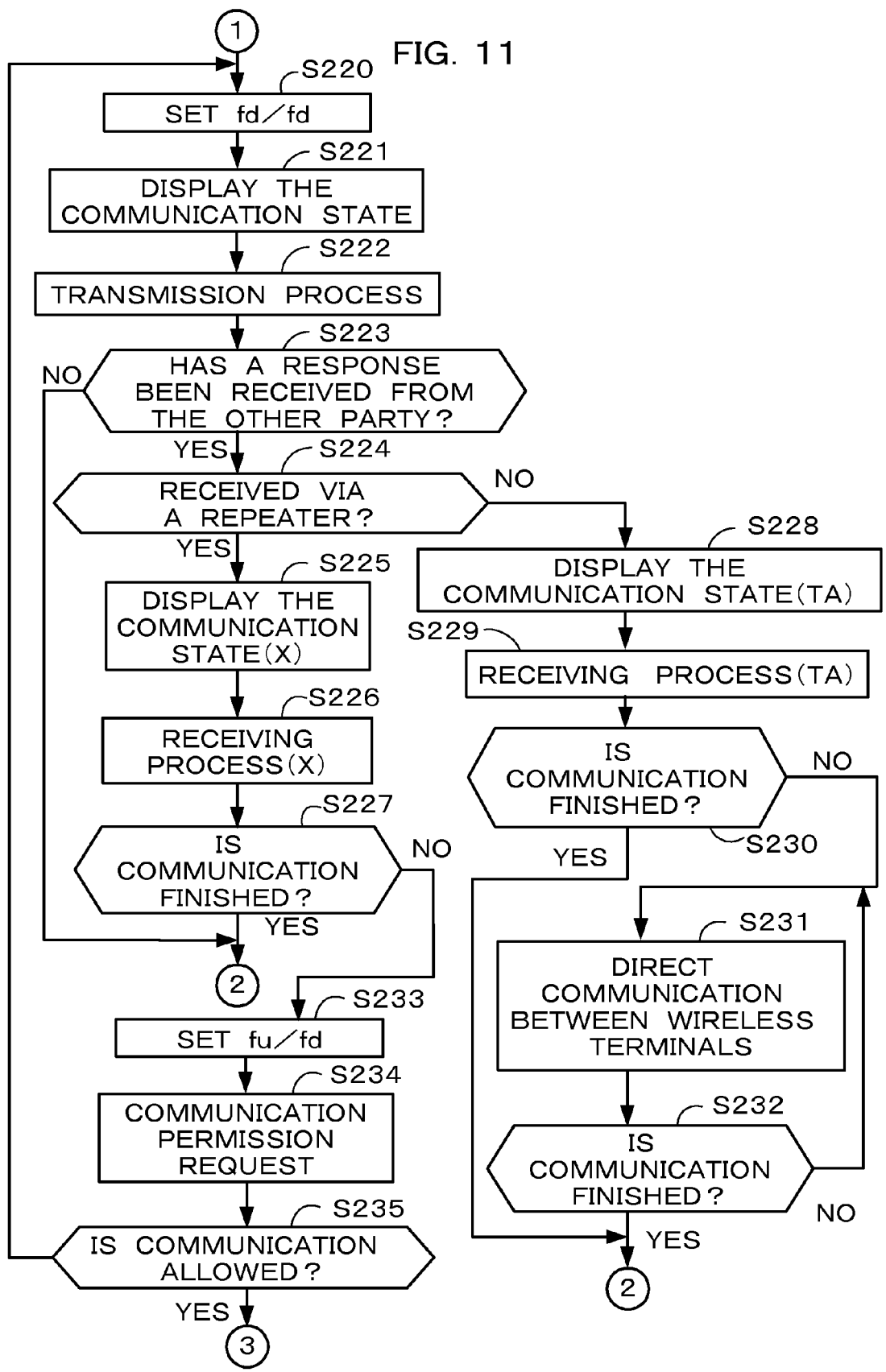
FIG. 11 is a continuation of the flowchart of FIG. 10 showing the operation of the CPU.

In step S224 in FIG. 11, when communication is not established via the repeater 111$_2$ (step S224: NO), the CPU 21 displays on the display unit 26 the talk-around communication state (step S228), and performs the receiving process of the talk-around method (step S229). Next, the CPU 21 determines whether or not communication has ended (step S230), and when communication has ended (step S230: YES), performs the disconnection process (step S212 in FIG. 10A), shifts to the frequency of the downlink signal from the home repeater, and in step S200 determines whether or not a downlink signal has been received from the home repeater.

In step S230, when talk-around communication has not ended (step S230: NO), the CPU 21 performs communication directly between the wireless terminal device TA and wireless terminal device TB (step S231). Next, the CPU 21 determines whether or not communication has ended (step S232), and when communication has ended (step S232: YES), performs the disconnection process (step S212 in FIG. 10A), shifts to the frequency of the downlink signal from the home repeater, and in step S200 determines whether or not a downlink signal has been received from the home repeater.

In step S227 in FIG. 11, when it is determined that combined-type communication has not ended (step S227: NO), in order to try communication using the trunking method again, the CPU 21 sets the transmitting frequency to the frequency fu of the uplink signal, and sets the receiving frequency to the frequency fd of the downlink signal (step S233). Next, the CPU 21 transmits a communication permission request to the repeater 111$_2$ (step S234). Continuing, the CPU 21 determines whether or not a communication permission response has been received from the repeater 111$_2$ (step S235), and when a communication permission response cannot be received (step S235: NO), or in other words, when communication using the trunking method is not possible, then in step S220, the CPU 21 sets both the transmitting frequency and the receiving frequency to the frequency fd of the downlink signal, and changes from the combined method to the talk-around method.

In step S235, when a communication permission request is received from the repeater $111_2$ (step S235:YES), the CPU 21 moves from the combined method to the trunking method, then in step S209 in FIG. 10A, the CPU 21 displays on the display unit 26 the trunking communication state (step S210), and, after that, performs communication using the trunking method with the wireless terminal device TB.

In this way, even in the wireless communication system of this second embodiment, it is possible to maintain good communication quality in areas where the radio signal environment is unstable and when wireless terminal devices having a difference in transmission power levels are communicating. Moreover, when switching between the trunking method and talk-around method of communication, it is not necessary to change both the receiving frequency and transmitting frequency, so that the switching time is made shorter, and it is possible to maintain good communication quality without the fear of communication becoming disrupted. Furthermore, when located in the fringe area at the boundary between the service area and out-of-range area of the repeater, even when the transmission power level of the wireless terminal device of the other party is low and trunking communication is not possible, it is possible to maintain good communication quality without having to maintain an idle channel for when the wireless terminal device of the other party returns to the service area, without communication being interrupted in order to maintain an idle channel.

The service area and fringe area illustrated in FIG. 6 are not fixed areas, and change due to changes in weather such as the surrounding temperature, the condition of other radio signals, the effect of ionospheric conditions, and the like. Particularly, in the range of the fringe area, the area itself is narrow and fluctuation is large, so that there is a high possibility of changing from the combined method to the trunking or talk-around method.

A first and second embodiment have been explained above; however, there are many common points and differences between the first embodiment and the second embodiment. The common points and differences of the first embodiment and second embodiment will be explained below.

In both the first embodiment and second embodiment, the wireless communication terminals TA and TB receive downlink signals from the repeater $111_1$, which is the home repeater, when in the standby mode. That is, the channel frequency in the standby state is the channel frequency of the repeater $111_1$, which is the home repeater. When communication starts, the wireless terminal device TA on the transmitting side acquires idle channel information that is included in a downlink signal from the repeater $111_1$, which is the home repeater, matches the channel frequency to the acquired idle channel frequency, and transmits a communication request. In the first and second embodiments, repeater $111_2$ is the idle channel, and the wireless terminal device TA transmits a communication request to the repeater $111_2$. After receiving a response from the repeater $111_2$ allowing communication, a link between the repeater $111_2$ and the wireless terminal device TA is established. At this time, for the wireless terminal device TB, the repeater $111_1$, which is the home repeater, transmits a control signal to the wireless terminal device TB to shift to the channel frequency of the repeater $111_2$, so the wireless terminal device TB, after receiving this control signal, shifts the channel frequency and receives communication from the wireless terminal device TA. Up to this point, both the first embodiment and second embodiment are the same.

In regards to the operation of the wireless terminal device, when performing communication, the user presses the PTT switch and talks; however, after talking, the user releases the PTT switch (this operation is the same for both the first embodiment and second embodiment). In the first embodiment, at the instant that the PTT switch is released, the wireless terminal devices return to the channel frequency of the home repeater. When the PTT of the wireless terminal device TA is released, the repeater $111_2$ receives "TX REL" that is inserted into the communication frame, and after sending "TX REL" as a downlink signal, becomes an "idle channel". The wireless terminal device TB receives "TX REL" in the relay frame from the repeater $111_2$ and returns to the channel frequency of the home repeater. In other words, when the PTT switch is released, the wireless terminal device TB returns to the home repeater. When there is a response from the wireless terminal device TB to the wireless terminal device TA, the wireless terminal device TB acquires idle channel information that is included in a downlink signal from the repeater $111_1$, which is the home repeater, matches the channel frequency with the acquired idle channel frequency, and transmits a communication request. After receiving a response from the repeater to which the communication permission request was transmitted allowing communication, a link is established between the repeater that provides the idle channel and the wireless terminal device TB. At this time, for the wireless terminal device TA, a control signal is transmitted from the repeater $111_1$, which is the home repeater, to the wireless terminal device TA indicating to shifts to the channel frequency of the repeater for which a link was established with the wireless terminal device TB, so that after receiving this control signal, the wireless terminal device TA shifts the channel frequency and receives communication from the wireless terminal device TB. This operation is repeated as long as communication continues.

On the other hand, in the second embodiment, even thought the PTT switch is released and "TX REL" is received, the repeater $111_2$ maintains the communication channel state between the wireless terminal device TA and wireless terminal device TB for a while. Therefore, in the first embodiment, when the wireless terminal device TA and wireless terminal device TB moved outside the range of the trunking system, direct communication is performed temporarily using the downlink frequency of the home repeater (in some cases, one of the wireless terminal devices communicates via the home repeater and the other performs direct communication.) However, in this second embodiment, direct communication is performed temporarily using the downlink frequency of the repeater $111_2$, which is the communication channel (in some cases, one of the wireless terminal devices communicates via the repeater $111_2$ and the other performs direct communication).

As described above, in each of the embodiments, the wireless terminal device TA detects whether or not there is a downlink signal having a first frequency fd that is transmitted from the repeater $111_2$, and from the downlink signal having frequency fd, detects whether or not the wireless terminal device TB of the intended other party has been acquired. As phase 1, when it is detected from the downlink signal having frequency fd that the wireless terminal device TB of the intended other party has been acquired, the wireless terminal device TA receives a downlink signal having frequency fd from the repeater $111_2$, as wells as transmits an uplink signal having a second frequency fu to the repeater 111₂, and performs communication settings for trunking communication with the wireless terminal device TB of the other party, then as phase 2, when a downlink signal having frequency fd is not detected, performs communication settings for talk-around communication with the wireless terminal device TB of the other party using a wireless signal having the same frequency fd as the downlink signal, and as phase 3, when it is not detected from the detected downlink signal having a frequency fd that the wireless terminal device TB of the other party has been acquired, transmits an uplink signal having frequency fu to the repeater 111₂, as well as receives a radio signal having the same frequency fd as the downlink signal from the wireless terminal device TB of the other party, and performs communication settings for combined trunking and talk-around communication with the wireless terminal device TB of the other party.

In this case, during trunking communication with the wireless terminal device TB, when a received signal having frequency fd that is received from the wireless terminal TB is not received via the repeater 111₂, and that received signal is not a response to the uplink signal having frequency fu, the wireless terminal device TA changes from the trunking method to the talk-around method; and when the received signal having frequency fd that is received from the wireless terminal TB is not received via the repeater 111₂, and that received signal is a response to the uplink signal having frequency fu, the wireless terminal device TA changes from the trunking method to the combined method.

Therefore, with the embodiments described above, it is possible to maintain good communication quality in areas where the radio signal environment is unstable and when wireless terminal devices having a difference in transmission power levels are communicating. Moreover, when switching between the trunking method and talk-around method of communication, it is not necessary to change both the receiving frequency and transmitting frequency, so the switching time is made shorter, and it is possible to maintain good communication quality without the fear of communication becoming disrupted. Furthermore, when located in the fringe area F-AREA at the boundary between the service area and out-of-range area of the repeater 111₂, even when the transmission power level of the wireless terminal device of the other party is low and trunking communication is not possible, it is possible to maintain good communication quality without acquire an idle channel once again for when the wireless terminal device of the other party returns to the service area, and without communication being interrupted in order to acquire an idle channel because communication is performed with the channel of the repeater 111₂ being maintained.

In the embodiments described above, the wireless terminal devices TA to TH display an icon image on the display unit 26 that makes clear the communication state; however, it is also possible to display an icon image only when the communication state has changed from the initial communication state. Moreover, it is also possible to not display an icon image when not particularly necessary.

When displaying an icon image on the display unit 26 that clearly indicates the communication state, users of the wireless terminal devices TA to TH are able to easily and accurately know the current communication state. As a result, it is possible to know when the position of one's own station is in the service area, in the fringe area or is out-of-range, as well as when moving it is possible to know which area the terminal is moving toward. In addition, by switching the transmission output according to the current communication state, it is possible to reduce power consumption.

The embodiments described above are for explaining the present invention; however the present invention is not limited to the embodiments described above, and other embodiments and variations thereof that are within the scope of the accompanying claims and that can be considered by those skilled in the art, belong to the present invention.

Figure 5:
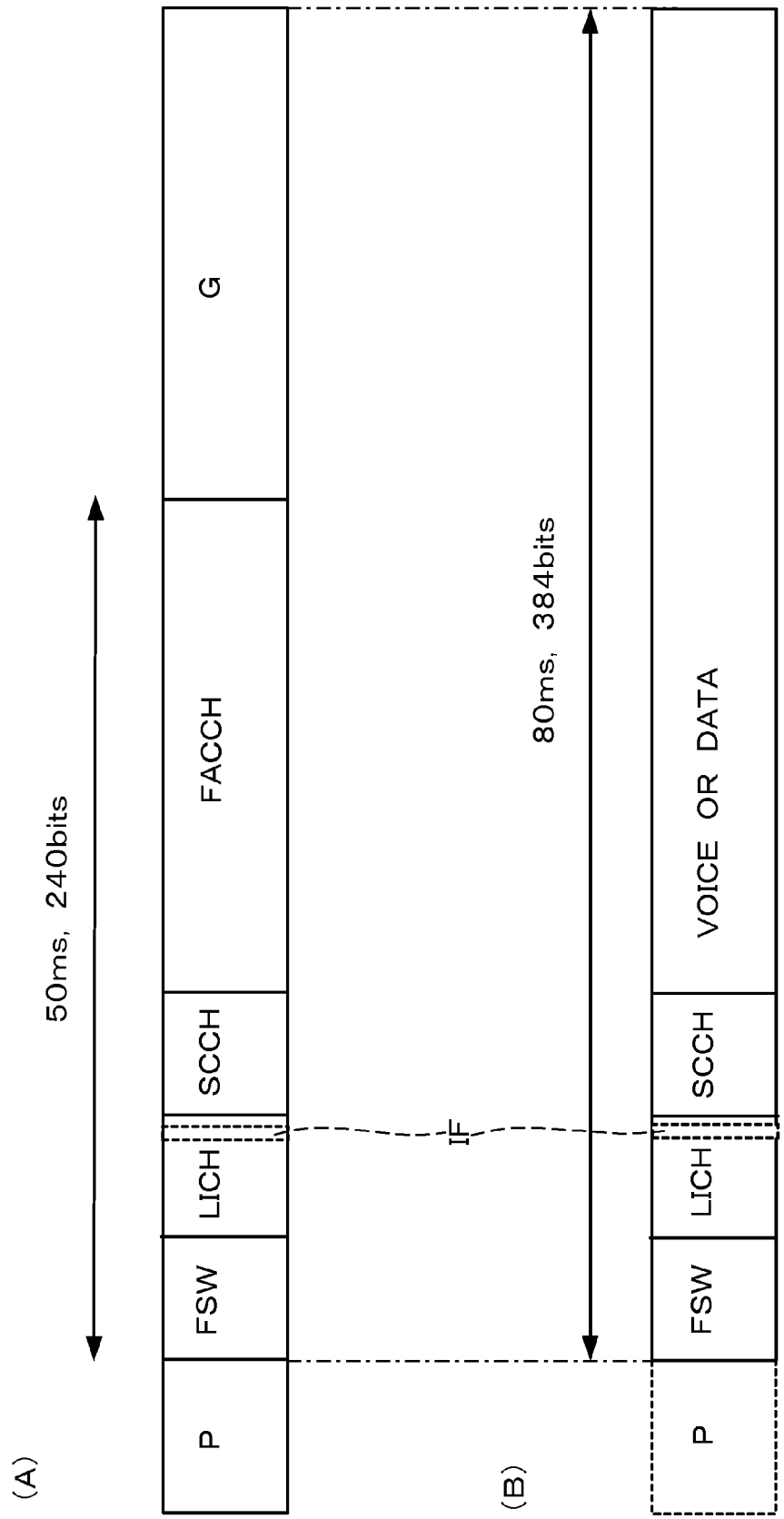
FIG. 5 is a diagram showing the frame format for transmission between a repeater in FIG. 1 and a wireless terminal device.

For example, in the embodiments described above, construction was such that whether its own station is moving out-of-range was determined by whether or not there was a response from a repeater 111 allowing communication; however, instead of whether or not there is a response allowing communication, construction is also possible in which whether its own station is moving out-of-range can be determined by extracting data from the header section H of the frame format illustrated in FIG. 5. In other words, this is possible by detecting a downlink signal from the repeater 111₂, and determining whether or not it is possible to extract information that is included in that downlink signal.

EXPLANATION OF REFERENCE NUMERALS

111₁ to 111ₙ Repeater
TA to TH Wireless Communication Terminal
S-Area Service Area
F-Area Fringe Area
fd First Frequency
fu Second Frequency

The invention claimed is:

1. A wireless terminal device that performs wireless communication with a wireless terminal device of another party via relay by a relay device or directly, comprising:
    communication permission request means for receiving a downlink signal that is transmitted from a pre registered specified relay device when requesting communication, specifying an idle channel based on idle channel information that is included in the downlink signal, and requesting communication permission from the relay device that provides the idle channel using an uplink frequency of the specified idle channel; and
    communication means that uses the same frequency as the frequency of the downlink signal from the specified relay device for transmitting a signal directly to the wireless terminal device of the other party requesting communication when it is not possible to receive the communication permission from the relay device from which the communication permission was previously requested.

2. The wireless terminal device according to claim 1, wherein
    the communication means comprises:
    response receiving means for receiving a response from the wireless terminal device of another party;
    determining means for determining whether or not the response comes directly from the wireless terminal device of the other party and not via a relay device;
    specification means for specifying a frequency that can be used when it is determined that the response is a direct response; and
    direct communication exchange means for setting the communication frequency to the specified useable frequency, and exchanging communication with the wireless terminal device of the other party.

3. The wireless terminal device according to claim 1, wherein
the communication permission request means includes means for selecting an idle channel and resending the communication request based on idle channel information that is included in the downlink signal from the specified relay device when communication permission could not be received.

4. The wireless terminal device according to claim 1, wherein
the communication means comprises means for matching the receiving frequency and transmitting frequency with the downlink frequency of the specified relay device and transmitting a signal to the wireless terminal device of the other party when communication permission could not be acquired and a downlink signal could not be received after transmitting a communication request.

5. The wireless terminal device according to claim 1, further comprising
means for waiting a set amount of time after communication permission has been received and the communication means transmits a signal when a downlink signal can be received from the specified relay device but no response is received from the terminal of the other party, and for executing a disconnection process when no response can be received even after waiting a set amount of time.

6. The wireless terminal device according to claim 1, further comprising means for determining the communication state and outputting information that indicates the communication state.

7. A wireless communication system comprising:
the wireless terminal device according to claim 1, and
a plurality of relay devices.

8. A wireless communication method, comprising steps of:
transmitting a downlink signal from a specified relay device, the downlink signal including idle channel information;
a wireless terminal device receiving the downlink signal that was transmitted from the specified relay device when requesting communication, specifying an idle channel based on the idle channel information that is included in the downlink signal, using an uplink frequency of the specified idle channel to request communication permission from a relay device that provides the idle channel;
transmitting a permission signal to the relay device that provides the idle channel when allowing communication; and
the wireless terminal device using the same frequency as the frequency of the downlink signal from the specified relay device to transmit a signal for requesting communication directly to a wireless terminal device of another party when the communication permission could not be received from the relay device from which the communication permission was previously requested.

9. A computer program stored on a non-transitory and non-volatile medium that causes a computer comprising a communication function to function as
communication permission request means for receiving a downlink signal that is transmitted repeatedly from a pre registered specified relay device, specifying an idle channel based on idle channel information that is included in the downlink signal, and requesting communication permission to a relay device that provides the idle channel using an uplink frequency of the specified idle channel to request communication permission; and
communication means that uses the same frequency as the frequency of the downlink signal from the specified relay device for transmitting a signal directly to a wireless terminal device of another party requesting communication when it is not possible to receive communication permission from the relay device from which the communication permission was previously requested.

* * * * *